United States Patent
Sasaki et al.

(10) Patent No.: US 12,219,253 B2
(45) Date of Patent: Feb. 4, 2025

(54) IMAGE PROCESSING APPARATUS, IMAGE CAPTURING APPARATUS, CONTROL METHOD FOR CONTROLLING IMAGE PROCESSING APPARATUS, AND STORAGE MEDIUM

(71) Applicant: CANON KABUSHIKI KAISHA, Tokyo (JP)

(72) Inventors: Takashi Sasaki, Kanagawa (JP); Kenji Onuki, Tokyo (JP); Jun Makino, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 181 days.

(21) Appl. No.: 18/163,517

(22) Filed: Feb. 2, 2023

(65) Prior Publication Data
US 2023/0269472 A1  Aug. 24, 2023

(30) Foreign Application Priority Data
Feb. 22, 2022 (JP) ................. 2022-026115

(51) Int. Cl.
| | |
|---|---|
| H04N 23/68 | (2023.01) |
| G06T 7/20 | (2017.01) |
| G06T 7/571 | (2017.01) |
| G06T 7/80 | (2017.01) |
| G06V 20/00 | (2022.01) |

(52) U.S. Cl.
CPC ............ *H04N 23/682* (2023.01); *G06T 7/20* (2013.01); *G06T 7/571* (2017.01); *G06T 7/80* (2017.01); *G06V 20/35* (2022.01); *H04N 23/6811* (2023.01); *G06T 2207/30201* (2013.01); *G06T 2207/30221* (2013.01)

(58) Field of Classification Search
None
See application file for complete search history.

(56) References Cited

U.S. PATENT DOCUMENTS

| | | | | |
|---|---|---|---|---|
| 2008/0293488 A1* | 11/2008 | Cheng | ............... | A63F 13/10 |
| | | | | 463/31 |
| 2011/0032414 A1* | 2/2011 | Sumiyoshi | ............. | H04N 23/73 |
| | | | | 348/E5.04 |
| 2011/0157392 A1* | 6/2011 | Chou | ............... | H04N 23/68 |
| | | | | 348/222.1 |

FOREIGN PATENT DOCUMENTS

| | | |
|---|---|---|
| JP | 2002077711 A | 3/2002 |
| JP | 2008015754 A | 1/2008 |
| JP | 2008301355 A | 12/2008 |

(Continued)

*Primary Examiner* — Quan Pham
(74) *Attorney, Agent, or Firm* — Canon U.S.A., Inc., IP Division

(57) ABSTRACT

An image processing apparatus includes an acquisition unit configured to acquire an image, a subject detection unit configured to detect a subject from the image, a motion amount detection unit configured to detect a motion amount of a first region of the subject and a motion amount of a second region of the subject, the second region being different from the first region, and an image capturing parameter determination unit configured to determine an image capturing parameter, wherein the image capturing parameter determination unit refers to the motion amount of the first region and the motion amount of the second region and determines the image capturing parameter so that a blur amount of the first region is less than a first standard and a blur amount of the second region is greater than a second standard.

18 Claims, 24 Drawing Sheets

(56) References Cited

FOREIGN PATENT DOCUMENTS

JP         2021180462  A   *  11/2021

* cited by examiner

FIG.10
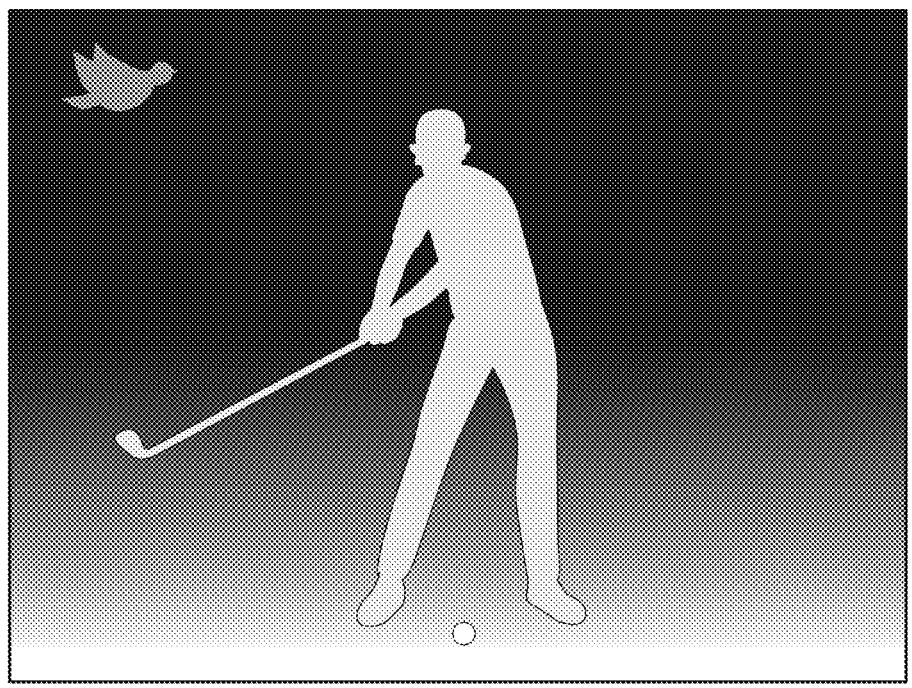
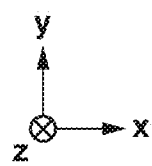

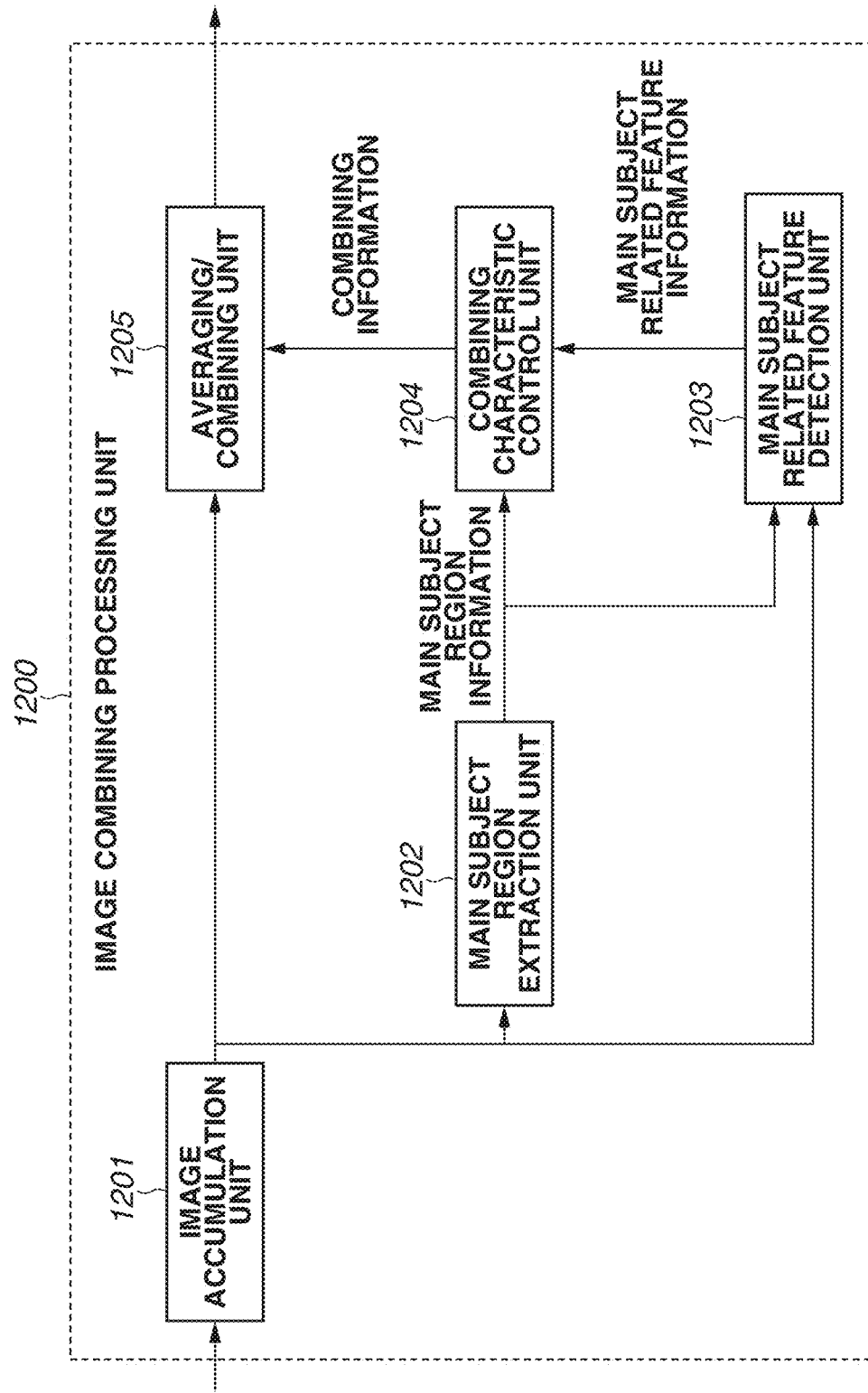

FIG.23
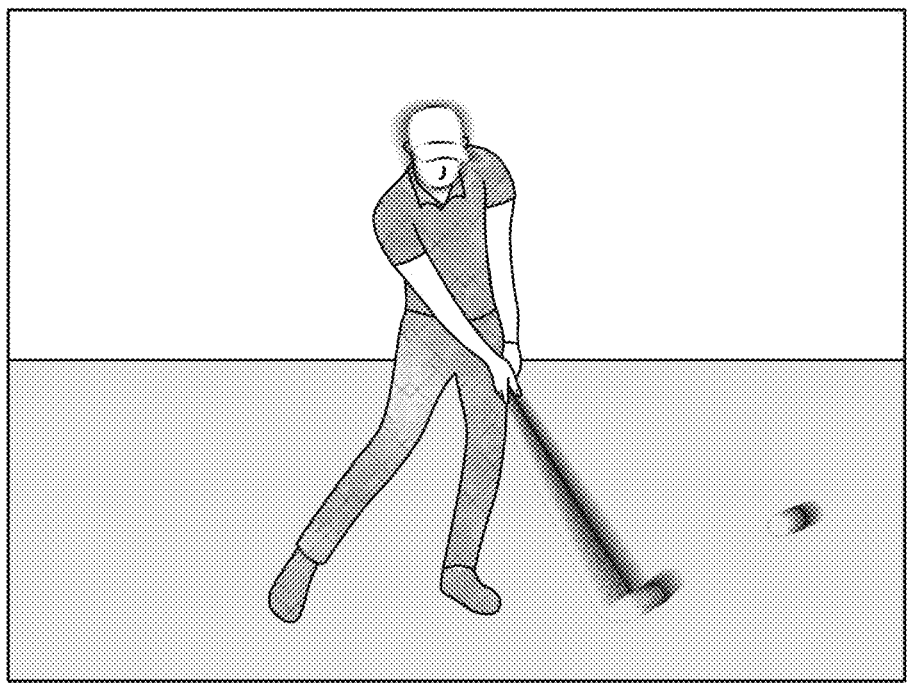
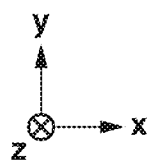

IMAGE PROCESSING APPARATUS, IMAGE CAPTURING APPARATUS, CONTROL METHOD FOR CONTROLLING IMAGE PROCESSING APPARATUS, AND STORAGE MEDIUM

BACKGROUND OF THE DISCLOSURE

Field of the Disclosure

The present disclosure relates to a technique for capturing images of subjects playing sports, especially sports that involve a swinging movement, such as golf.

Description of the Related Art

In recent years, some models of digital cameras include a sport image capturing mode. In the sport image capturing mode, a high shutter speed is automatically set, and subject images with a reduced motion blur are captured. For example, Japanese Patent Application Laid-Open No. 2008-301355 discusses a technique for determining a shutter speed based on an analysis result of motion in a face region of a subject.

In capturing images of a subject playing a sport (hereinafter, referred to as a "swing sport") that involves a swing movement of a club or a bat, it is generally desirable that a face of the subject playing the sport be not blurred. Meanwhile, a motion blur of a swinging region such as a club or an arm provides a dynamic impression and conveys the liveliness of the play to observers more impressively. The sport image capturing mode, however, does not consider capturing images with a motion blur in swinging regions and without a motion blur in a face region.

SUMMARY OF THE INVENTION

The present disclosure is directed to an image processing apparatus capable of automatically determining an image capturing parameter including a shutter speed based on a motion analysis result of a face and a swinging region and an estimation result of a moving direction of the swinging region while a swinging speed and a swinging direction that vary for different scenes are additionally considered.

According to an aspect of the present disclosure, an image processing apparatus includes at least one processor, and a memory storing instructions that, when executed by the at least one processor, configures the at least one processor to function as an acquisition unit configured to acquire an image, a subject detection unit configured to detect a subject from the image, a motion amount detection unit configured to detect a motion amount of a first region of the subject and a motion amount of a second region of the subject, the second region being different from the first region, and an image capturing parameter determination unit configured to determine an image capturing parameter, wherein the image capturing parameter determination unit refers to the motion amount of the first region and the motion amount of the second region and determines the image capturing parameter so that a blur amount of the first region is less than a first standard and a blur amount of the second region is greater than a second standard.

Further features of the present disclosure will become apparent from the following description of exemplary embodiments with reference to the attached drawings.

BRIEF DESCRIPTION OF THE DRAWINGS

FIG. 10 is a diagram illustrating a defocus map corresponding to the image at time t according to the first exemplary embodiment.

FIG. 12 is a diagram illustrating a configuration of an image combining processing unit according to a second exemplary embodiment.

FIG. 23 is a diagram illustrating an image in a case where a face image is blurred.

DESCRIPTION OF THE EMBODIMENTS

Exemplary embodiments of the present disclosure will be described in detail below with reference to the attached drawings. Note that the below-described exemplary embodiments are not intended to limit the claimed disclosure. Further, while a plurality of features is described in the exemplary embodiments, not all of the features are always essential to the disclosure, and the plurality of features can be combined as desired. Further, the same or similar components are given the same reference number in the attached drawings, and redundant descriptions thereof are omitted.

A first exemplary embodiment of the present disclosure will be described in detail below with reference to the drawings. The below-described exemplary embodiment is an image capturing apparatus, and an example where the present disclosure is applied to a digital camera as an example of the image capturing apparatus will be described below.

Figure 1:
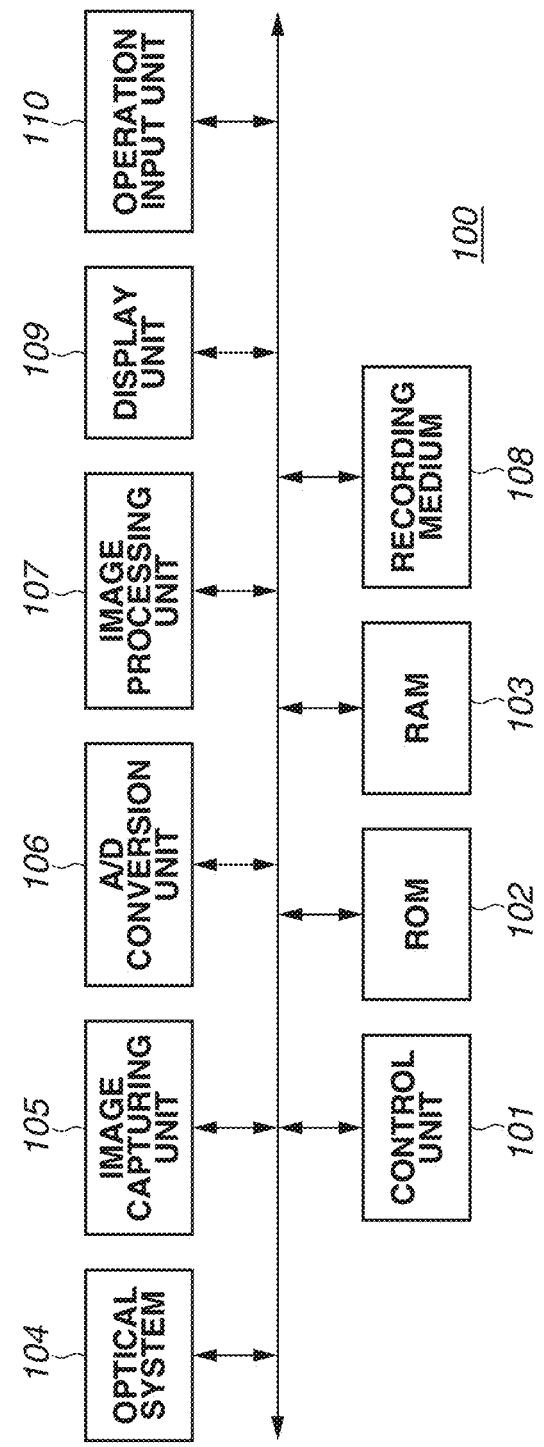
FIG. 1 is a diagram illustrating a configuration of a digital camera according to a first exemplary embodiment.

FIG. 1 is a block diagram illustrating a functional configuration of a digital camera according to an exemplary embodiment of the present disclosure.

A control unit 101 is, for example, a central processing unit (CPU) and controls operations of blocks of a digital camera 100 by reading operation programs for the blocks of the digital camera 100 from a read-only memory (ROM) 102, loading the read programs into a random access memory (RAM) 103, and executing the loaded programs. The ROM 102 is a non-volatile rewritable memory and stores parameters for operations of the blocks in addition to the programs for operations of the blocks of the digital camera 100. The RAM 103 is a volatile rewritable memory and is used as a temporary storage area for temporarily storing data output during operations of the blocks of the digital camera 100.

An optical system 104 forms a subject image on an image capturing unit 105. The optical system 104 includes, for example, a fixed lens, a magnifying lens, and a focus lens. The magnifying lens changes a focal length, and the focus lens performs focus adjustment. The optical system 104 further includes a diaphragm and performs light amount adjustment during image capturing by adjusting an aperture diameter of the optical system 104 using the diaphragm. The image capturing unit 105 is, for example, an image sensor such as a charge-coupled device (CCD) sensor or a complementary metal oxide semiconductor (CMOS) sensor. The image capturing unit 105 photoelectrically converts an optical image formed on the image sensor by the optical system 104 and outputs an acquired analog image signal to an analog/digital (A/D) conversion unit 106. The A/D conversion unit 106 applies A/D conversion processing to an input analog image signal and outputs acquired digital image data to the RAM 103, and the RAM 103 stores the digital image data.

An image processing unit 107 applies various types of image processing such as white balance adjustment, color interpolation, and gamma processing to image data stored in the RAM 103 and outputs the image data to the RAM 103. Further, the image processing unit 107 includes an image capturing control parameter generation unit 200 described below. With the image capturing control parameter generation unit 200, the image processing unit 107 recognizes a scene of image data stored in the RAM 103 and generates an image capturing parameter of the digital camera 100 based on a motion analysis result using image data and an estimation result of a moving direction of a subject. An image capturing control parameter generated by the image processing unit 107 is output to the control unit 101, and the control unit 101 controls operations of the blocks of the digital camera 100.

A recording medium 108 is a removable memory card or the like, and images stored in the RAM 103 after being processed by the image processing unit 107 and images stored in the RAM 103 after undergoing A/D conversion by the A/D conversion unit 106 are recorded as recorded images in the recording medium 108. A display unit 109 is a display device such as a liquid crystal device (LCD). The display unit 109 presents various types of information on the digital camera 100. For example, the display unit 109 provides an electronic viewfinder function by displaying a live view image of a subject image captured by the image capturing unit 105, and reproduces an image recorded in the recording medium 108 and displays the reproduced image. Further, an icon based on a scene recognition result of image data by the image processing unit 107 can be superimposed and displayed on an image.

An operation input unit 110 includes user input interfaces such as a release switch, a set button, and a mode selection dial, and in a case where an operation input by a user is detected, a control signal corresponding to the input operation is output to the control unit 101. Further, in a mode where the display unit 109 includes a touch panel sensor, the operation input unit 110 also functions as an interface that detects a touch operation performed on the display unit 109.

A configuration and basic operations of the digital camera 100 have been described above.

Next, operations of the image processing unit 107, which is a feature of the first exemplary embodiment of the present disclosure, will be described in detail below. In the first exemplary embodiment, an example will be described where the image processing unit 107 generates image capturing parameter (shutter speed, aperture value, International Organization for Standardization (ISO) sensitivity) of the digital camera 100 that enable capturing of an image of a subject performing a golf swing so that a motion blur of a face region is reduced while a swinging region includes a motion blur, and captures the image of the subject.

Figure 2:
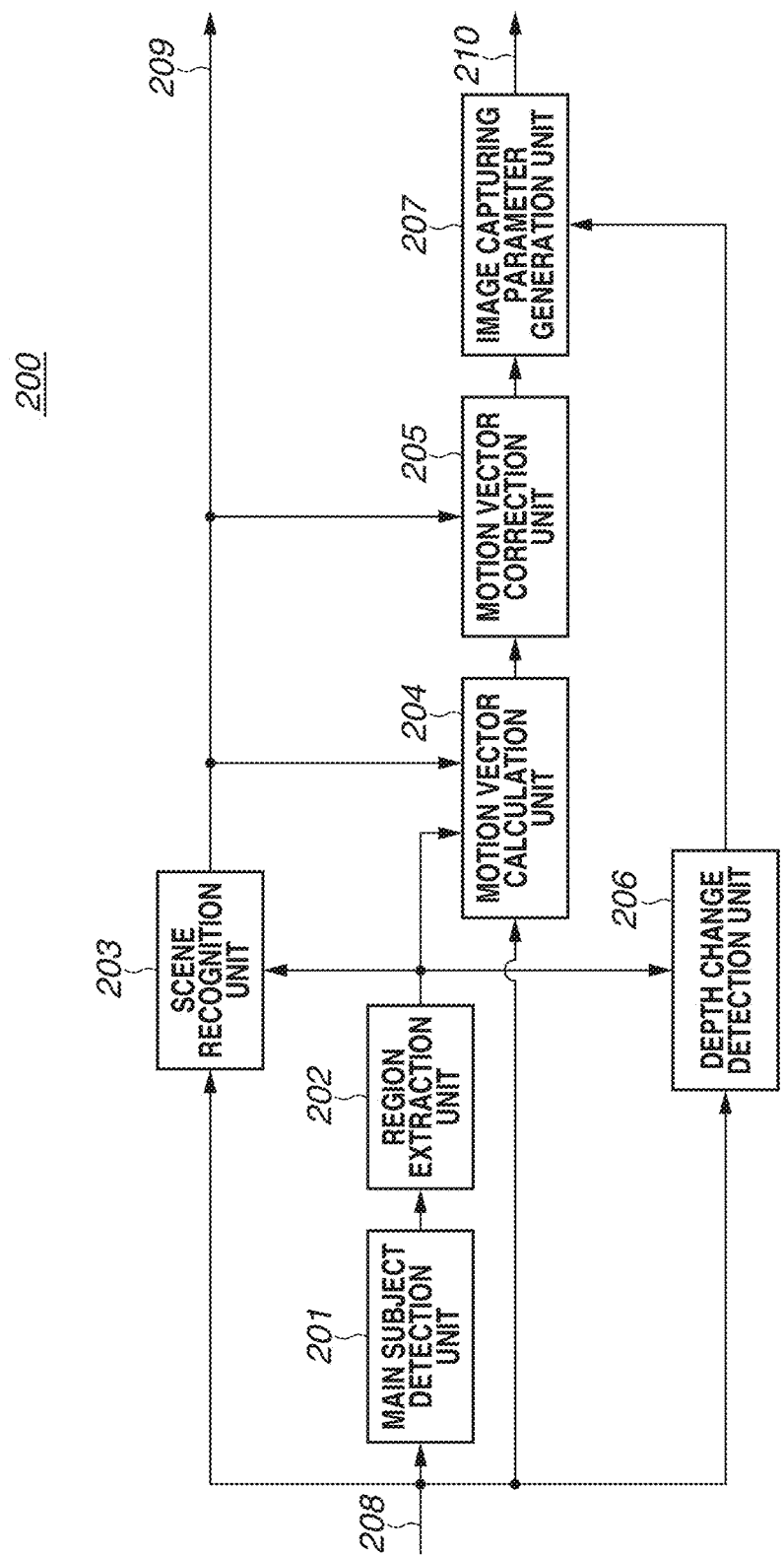
FIG. 2 is a diagram illustrating a configuration of an image capturing control parameter generation unit according to the first exemplary embodiment.

First, an example of a configuration of the image capturing control parameter generation unit 200 of the image processing unit 107 will be described below with reference to FIG. 2. FIG. 2 is a diagram illustrating the example of the configuration of the image capturing control parameter generation unit 200. The image capturing control parameter generation unit 200 includes a main subject detection unit 201, a region extraction unit 202, a scene recognition unit 203, a motion vector calculation unit 204, a motion vector correction unit 205, a depth change detection unit 206, and an image capturing parameter generation unit 207. The image capturing control parameter generation unit 200 receives image data 208 captured by the image capturing unit 105 and stored in the RAM 103 as input and outputs a scene recognition result 209 and an image capturing parameter 210.

Next, a process of the image capturing control parameter generation unit 200 will be described below with reference to a flowchart in FIG. 3.

In step S301, a user turns on the digital camera 100 and starts preparatory image capturing such as framing. During the preparatory image capturing, the control unit 101 continuously captures images while maintaining a predetermined frame rate. The captured images are displayed on the display unit 109, and the user performs framing while viewing the displayed images. The frame rate according to the present exemplary embodiment is 120 frames per second.

Figure 4:
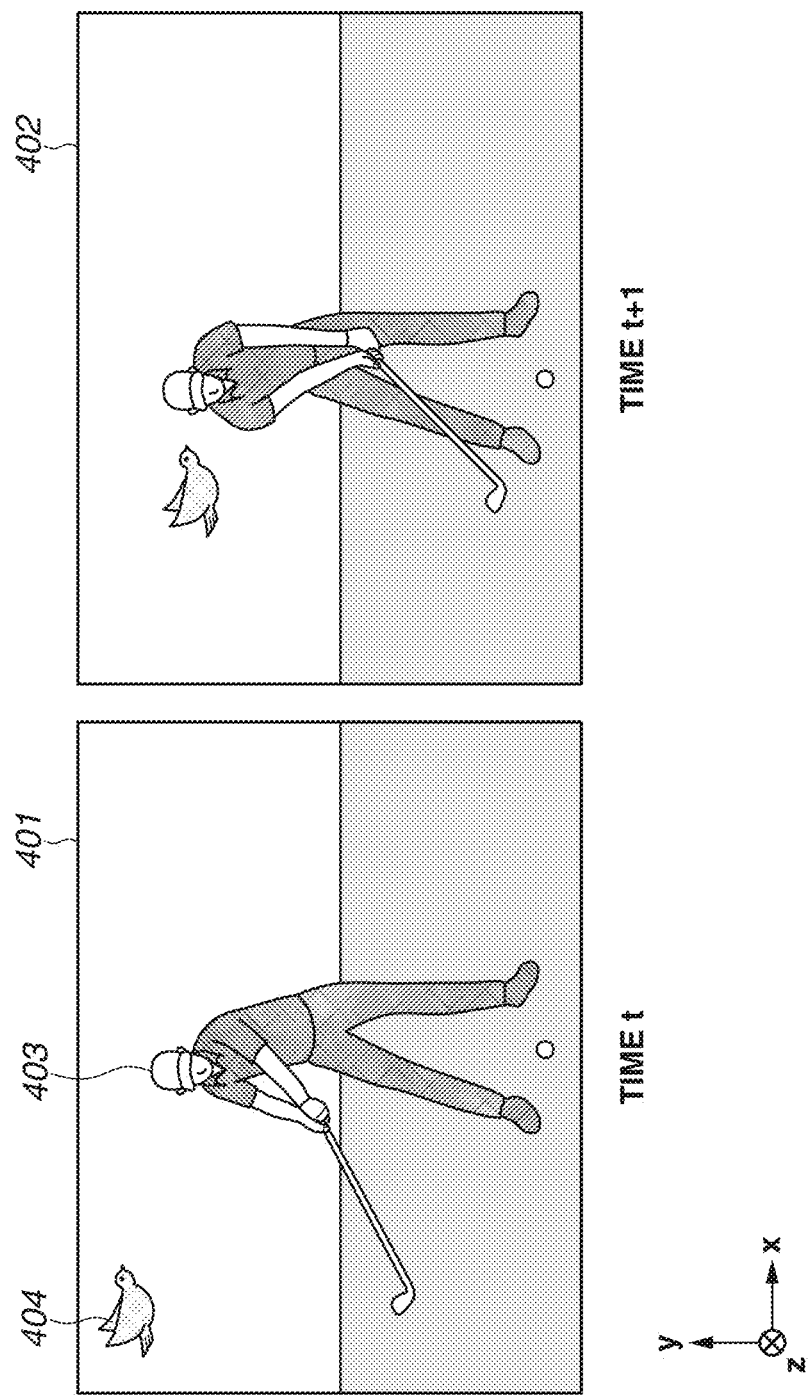
FIG. 4 is a diagram illustrating consecutively-captured images according to the first exemplary embodiment.

Specifically, the image capturing unit 105 captures an image every $1/120$ seconds. Further, the shutter speed in capturing is set to the shortest possible shutter speed. FIG. 4 illustrates an example of images captured consecutively. An image 401 is an image at time t, and an image 402 is an image at time t+1. Further, FIG. 4 illustrates a situation where images of a person performing a golf swing are captured, and a person subject 403 and a bird 404 flying far behind the person subject 403 are captured, although the bird 404 is not an intended subject. Since the image capturing is performed at a short exposure time, the captured images do not include significant blurs. Further, an image size is 2100×1400 pixels, and a pixel size is 5 µm.

While golf is described as an example of sports (swing sports) that involve a swing movement according to the present exemplary embodiment, the present exemplary embodiment is also applicable to other sports. Specific examples are tennis, badminton, table tennis, baseball, lacrosse, hockey, fencing, kendo, canoeing, and rowing. The image capturing parameter is automatically generated so that swinging sporting equipment in each sport includes a motion blur, and dynamic images are captured. While sports are described as an example according to the present exemplary embodiment, scenes that involve a swing movement are not limited to sports. Other possible examples are a scene of fighting where a single- or double-edged sword is used and a scene of fishing where a fishing rod is shaken and thrown. Specifically, various variations of target objects (swinging target objects) related to a swing movement other than the above-described sporting equipment can be considered for different scenes.

In step S302, the main subject detection unit 201 performs main subject detection on the image data 208 captured in step S301, under control of the control unit 101. The person subject 403 is detected herein. A publicly-known technique can be used as a method for detecting the person subject 403 as a main subject. For example, a method discussed in Japanese Patent Application Laid-Open No. 2002-77711 can be used. Further, the main subject detection unit 201, by referring to a defocus map, can extract regions of a body, hands, legs, and a held club that are at a depth substantially equal to a depth of a face. The defocus map is distance distribution information described below.

In step S303, the region extraction unit 202 extracts, under the control of the control unit 101, a face region and a swinging object (golf club) region of the person subject 403 detected by the main subject detection unit 201. A publicly-known technique can be used as a method for extracting the face region and the club region, and each region can be extracted if a detection target is changed in Japanese Patent Application Laid-Open No. 2002-77711.

In step S304, the scene recognition unit 203 recognizes a captured scene of the image data 208 under the control of the control unit 101. A type of sports (target scene) is recognized here. A publicly-known technique can be used as a method for recognizing the type of sports performed in input image data. For example, a method discussed in Aki Shibutani, Yoshiaki Sugiyama, and Yasuo Ariki, "Automatic Discrimination of Sports News and Retrieval of Similar Scenes", The 55th Annual Meetings of The Information Processing Society of Japan, pp. 65-66 (1997 September) can be used. Further, the scene recognition unit 203 can output information indicating whether the type of sports is recognized successfully or unsuccessfully. Further, information about the main subject detected in step S302 can be used. In this case, a nearby audience captured accidentally is excluded from scene recognition targets, and this improves the accuracy of recognition.

The scene recognition unit 203 further estimates a moving direction and a moving range of the club at and after an image capturing time based on a recognition result of the type of sports and a result of estimating the position and orientation of the club based on how the digital camera 100 and the person subject 403 face each other and image data of the club region extracted in step S303. For example, a case is discussed where a subject playing golf faces frontward with respect to a camera, the club is positioned to the left on a screen, and a face of the club faces to the right with respect to the screen in an image. In this case, predicted results for a situation are preset, e.g., the club will move rightward along a bottom side of the screen, and a setting can be selected depending on the situation, so that the estimation of the moving direction and the moving range can be achieved. Further, for example, a method discussed in Ryosuke Araki, Kohsuke Mano, Takeshi Onishi, Masanori Hirano, Tsubasa Hirakawa, Takayoshi Yamashita, Hironobu Fujiyoshi, "Object Grasping Using Object Pose Estimation by Repeated Updating Based on Back-Propagation of Image Generation Network", The Annual Conference of The Robotics Society of Japan, 2020 can be used as a method for estimating the position and orientation of the club.

The scene recognition unit 203 outputs, collectively as the scene recognition result 209, information indicating whether the recognition is successful or unsuccessful, the recognized type of sports, and the result of estimating the moving direction and the moving range of a swinging object such as the club.

Figure 5:
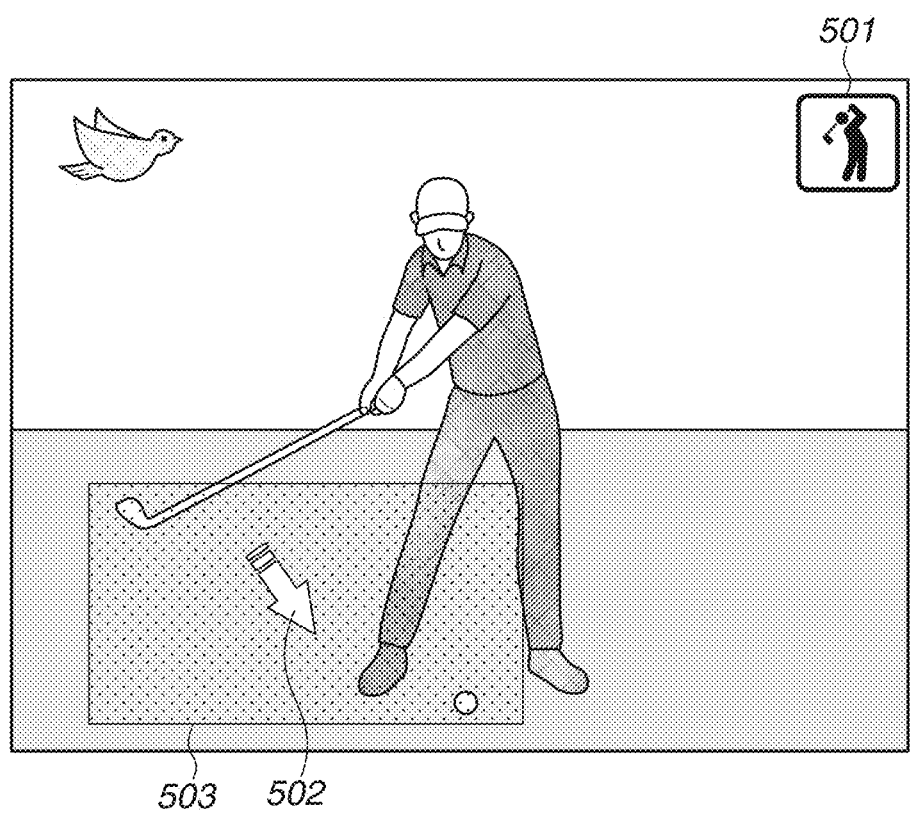
FIG. 5 is a diagram illustrating an effect of superimposing a scene recognition result on a display image according to the first exemplary embodiment.

Meanwhile, the image processing unit 107 can superimpose the recognized type of sports and the result of estimating the moving direction and the moving range of the swinging object such as the club on the image data based on the scene recognition result 209. The image data on which the estimation result is superimposed can be displayed on the display unit 109 under the control of the control unit 101. This is illustrated in FIG. 5. In FIG. 5, an icon 501 indicates the recognized sport, a direction 502 indicates the estimated moving direction of the club, and a hatched region 503 indicates the estimated moving range of the club. The display of the scene recognition result on the display unit 109 during the preparatory image capturing enables the user to confirm that the digital camera 100 is attempting to generate the image capturing parameter for capturing dynamic images of the swing sport. A method for notifying the user of the recognized sport is not limited to display of the icon, and a configuration in which the user is notified thereof by, for example, a sound can also be employed.

In step S305, the control unit 101 checks the information that is output by the scene recognition unit 203 and indicates whether the type of sports is recognized successfully or unsuccessfully. In a case where the recognition is successful (YES in step S305), the processing proceeds to step S307 to continue the process. On the other hand, in a case where the recognition is unsuccessful (NO in step S305), the processing proceeds to step S306. In step S306, the image capturing parameter for a normal sports mode is set, and the parameter setting process is completed. Specifically, a high shutter speed is set, and an aperture value and an ISO sensitivity are set based on the brightness in an image capturing environment.

In step S307, the motion vector calculation unit 204 calculates, under the control of the control unit 101, a motion vector between consecutively-captured images and a motion vector reliability. The motion vector indicates a moving amount of the subject in a horizontal direction and a moving amount of the subject in a vertical direction between images in the form of a vector. A motion vector calculation method will be described in detail below with reference to FIGS. 6, 7, 8.

Figure 6:
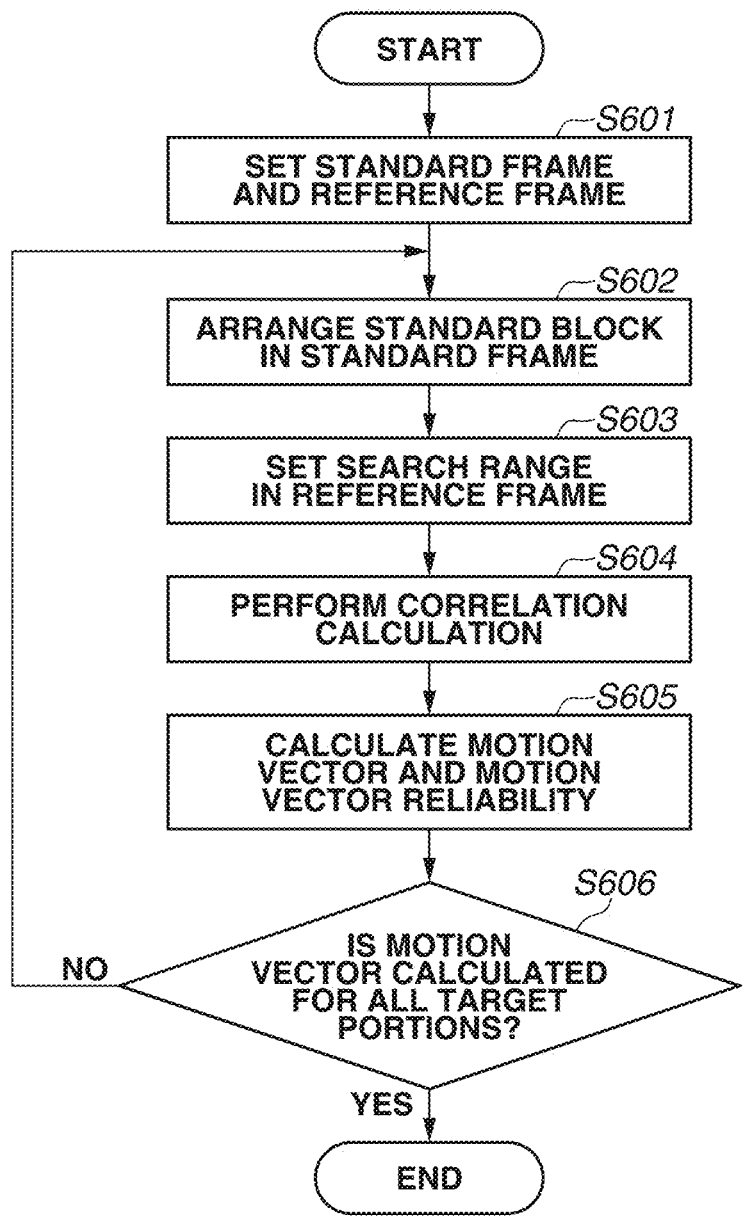
FIG. 6 is a flowchart illustrating a motion vector calculation method according to a conventional technique.
Figure 7:
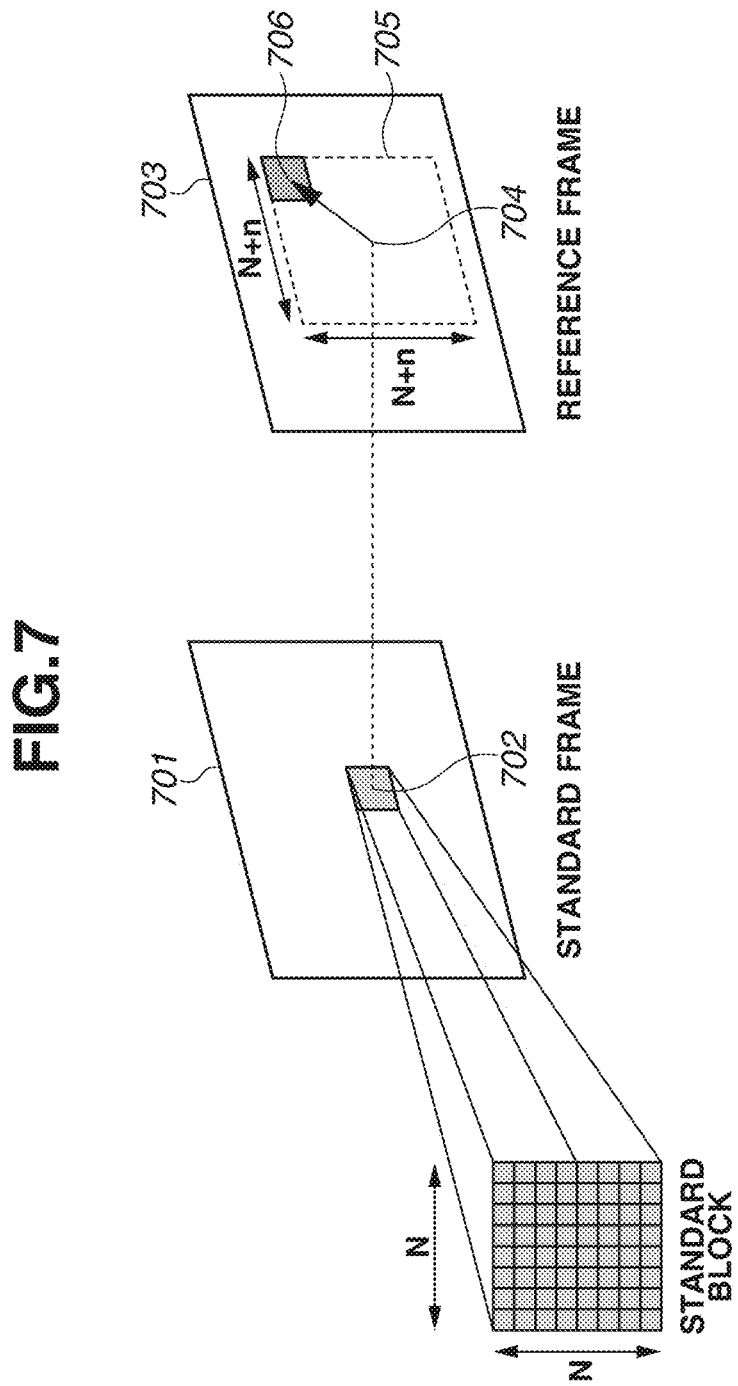
FIG. 7 is a diagram illustrating the motion vector calculation method according to the conventional technique.

FIG. 6 is a flowchart illustrating a process of calculating the motion vector and the motion vector reliability by the motion vector calculation unit 204. FIG. 7 is a diagram illustrating the motion vector calculation method using block matching. While the block matching is described as an example of the motion vector calculation method according to the present exemplary embodiment, the motion vector calculation method is not limited to the example and can be, for example, a gradient method.

In step S601 in FIG. 6, two captured images that are temporally adjacent to each other are input to the motion vector calculation unit 204. In the present exemplary embodiment, the motion vector calculation unit 204 sets the image captured at time t in FIG. 4 as a standard frame and sets the image captured at time t+1 as a reference frame.

In step S602 in FIG. 6, the motion vector calculation unit 204 arranges a standard block 702 of N×N pixels in a standard frame 701 as illustrated in FIG. 7. In the present exemplary embodiment, a region to arrange the standard block 702 in is limited to the face region of the person subject 403 and the golf club region that are extracted by the region extraction unit 202 in step S303. With this configuration, only motion information necessary for generating the image capturing parameter is efficiently analyzed. In particular, a correlation calculation in step S604 described below is high in processing load. Thus, the motion vector calculation unit 204 performing the calculation using only the necessary regions increases the speed of generating the image capturing parameter, and dynamic images of swing sports can be captured without being missed.

In step S603 in FIG. 6, the motion vector calculation unit 204 sets, in a reference frame 703 as illustrated in FIG. 7, coordinates 704 corresponding to coordinates of a center of the standard block 702 of the standard frame 701 and sets (N+n)×(N+n) pixels around the coordinates 704 as a search range 705. The setting of the search range 705 is also limited to a region around the face region of the person subject 403 and a region around the golf club region as in step S602. In particular, a search region for the golf club is limited to the moving range of the club that is estimated by the scene recognition unit 203 and indicated as the region 503 in FIG. 5. With the foregoing configuration, only motion information necessary for generating the image capturing parameter is efficiently analyzed.

In step S604 in FIG. 6, the motion vector calculation unit 204 performs the correlation calculation of the standard block 702 of the standard frame 701 and a reference block 706 of N×N pixels at different coordinates in the search range 705 of the reference frame 703, and calculates a correlation value. The correlation value is calculated based on the sum of absolute values of differences between the frames for the pixels in the standard block 702 and the reference block 706. Specifically, coordinates with the smallest value of the sum of absolute values of differences between the frames are determined as coordinates with the greatest correlation value. A correlation value calculation method is not limited to the method of calculating the sum of absolute values of differences between frames and, for example, a method of calculating a correlation value based on the sum of squares of differences between frames or a normalized cross-correlation value can be used. In the example in FIG. 7, the reference block 706 is indicated as having the highest correlation.

In step S605 in FIG. 6, the motion vector calculation unit 204 calculates a motion vector based on the coordinates of the reference block indicating the highest correlation value calculated in step S604, and determines the correlation value of the motion vector as a motion vector reliability. In the case of the example in FIG. 7, a motion vector is calculated based on the coordinates 704 corresponding to the coordinates of the center of the standard block 702 of the standard frame 701 and coordinates of a center of the reference block 706 in the search range 705 of the reference frame 703. Specifically, the distance and direction from the coordinates 704 to the coordinates of the center of the reference block 706 are calculated as the motion vector. Further, a correlation value that is a result of calculating a correlation with the reference block 706 in calculating the motion vector is calculated as the motion vector reliability. The motion vector reliability increases at a greater correlation value between the standard block and the reference block.

In step S606 in FIG. 6, the motion vector calculation unit 204 determines whether the motion vector is calculated for target portions where the standard block 702 is to be arranged in the standard frame 701, i.e., the face region of the person subject 403 and the golf club region that are extracted by the region extraction unit 202 in step S303 according to the present exemplary embodiment. In a case where the motion vector calculation unit 204 determines that the motion vector is calculated for all the target portions (YES in step S606), the motion vector calculation process is ended. On the other hand, in a case where the motion vector calculation unit 204 determines that the motion vector is not calculated for all the target portions (NO in step S606), the processing returns to step S602 to repeat the subsequent process. Further, the standard block 702 can be set for each pixel among all the pixels included in the face region and the golf club region or can be set only for a representative pixel in each region. In the present exemplary embodiment, the standard block 702 is set only for the representative pixel.

Figure 8:
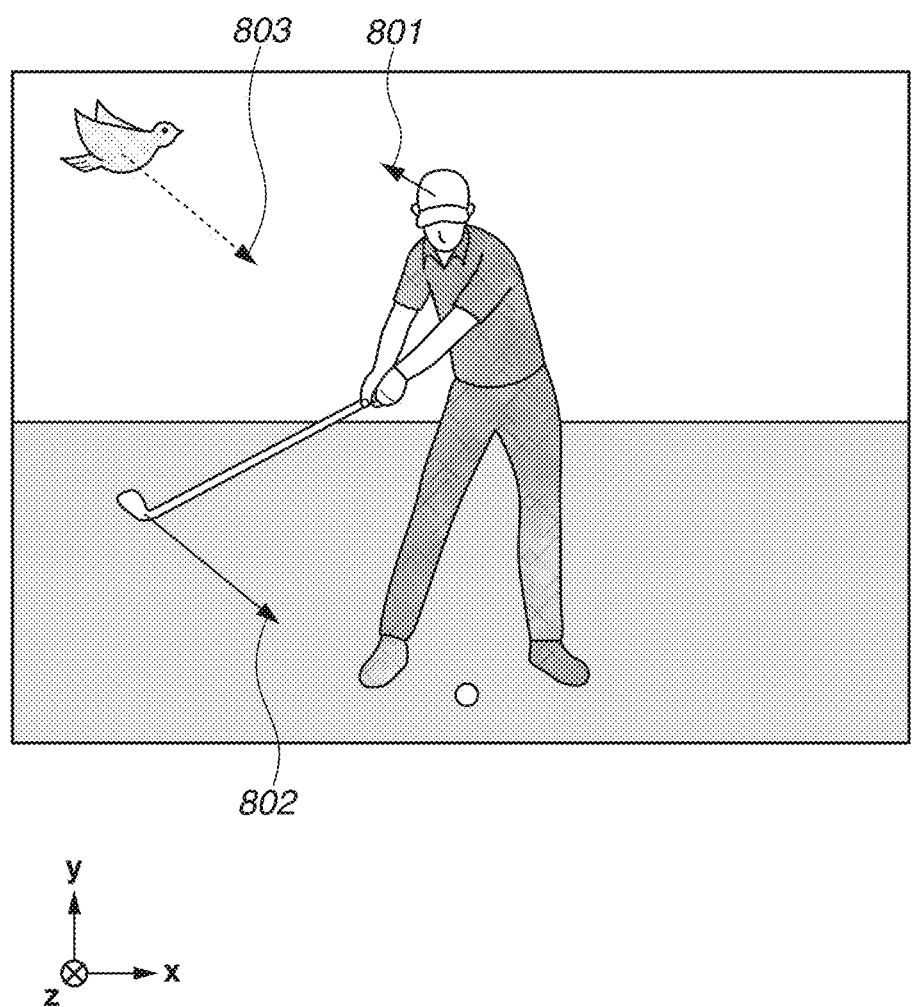
FIG. 8 is a diagram illustrating an image at time t with motion vectors superimposed thereon according to the first exemplary embodiment.

FIG. 8 illustrates the motion vectors between the captured images that are calculated based on the above-described process. In FIG. 8, each arrow indicates a motion vector, and the length and direction of the arrow respectively indicate the size and direction of the motion vector. A motion vector 801 is a motion vector of the face region of the person subject 403, and a motion vector 802 is a motion vector of the golf club region. Since the golf club is swinging at high speed, the moving amount of the golf club region between the frames is greater than that of the face region. Meanwhile, a broken line 803 is a motion vector of the bird 404 in the background. While no reference block is set for the bird 404 according to the present exemplary embodiment, as described in S602, the motion vector of the bird 404 is indicated by the broken line 803 in order to describe features of the control according to the present exemplary embodiment. The motion vectors 802 and 803 are the same in size and direction. In a case where the image capturing parameter generation unit 207 described below refers to only the sizes and directions of motion vectors within the screen in referring to the calculated motion vectors and determining the shutter speed, the determination may be affected by an effect of a motion vector of a moving subject in the background. In the present exemplary embodiment, region extraction and scene recognition are performed in advance to exclude the effect of an irrelevant motion vector, such as the motion vector 803, in a subject region. This improves the accuracy of generated image capturing parameter.

The description of the process in FIG. 3 will resume below.

Figure 9A:
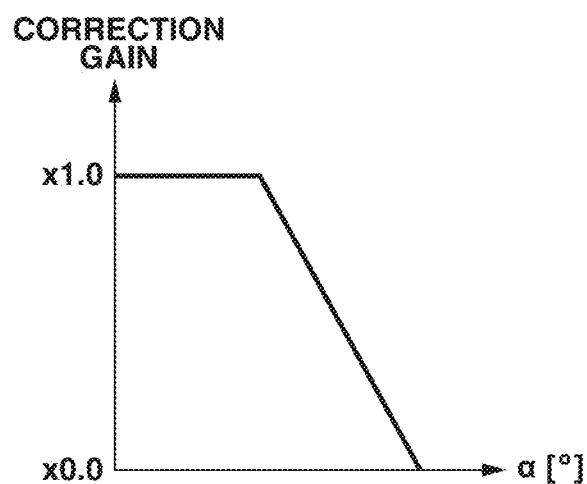
FIGS. 9A and 9B are diagrams illustrating correction gains to be applied to motion vectors according to the first exemplary embodiment.

In step S308, the motion vector correction unit 205 corrects the motion vector output by the motion vector calculation unit 204 based on information about the estimated moving direction of the swinging object region such as the club that is output by the scene recognition unit 203. Specifically, the motion vector of the club region is multiplied by a correction gain indicated in FIG. 9A, where α (0° to 180°) is an angle formed by the estimated moving direction generated in step S304 and the motion vector of the club region that is calculated in step S307. The closer the estimated direction is to the calculated direction of the motion vector (the formed angle is close to 0°), the closer the gain amount is to 1.0, and the calculated motion vector is used without being corrected.

On the other hand, in a case where the angle formed by the estimated direction and the calculated direction of the motion vector is significantly different, the motion vector may not have been calculated correctly, so that use of the motion vector in setting the image capturing parameter is prevented. Examples of a case where a motion vector cannot be calculated correctly are as described below. A first example is a case where a swinging object is moving at high speed and images captured during the preparatory image capturing include a motion blur that makes edges of the subject indistinct. A second example is a case where an incorrect correlation value is calculated by the correlation calculation due to a false edge caused by a double-line blur. Further, in a case where the image capturing is performed in a relatively dark environment, accuracy of the motion vector is decreased by effects of random noise caused by an increase in ISO sensitivity.

Figure 9B:
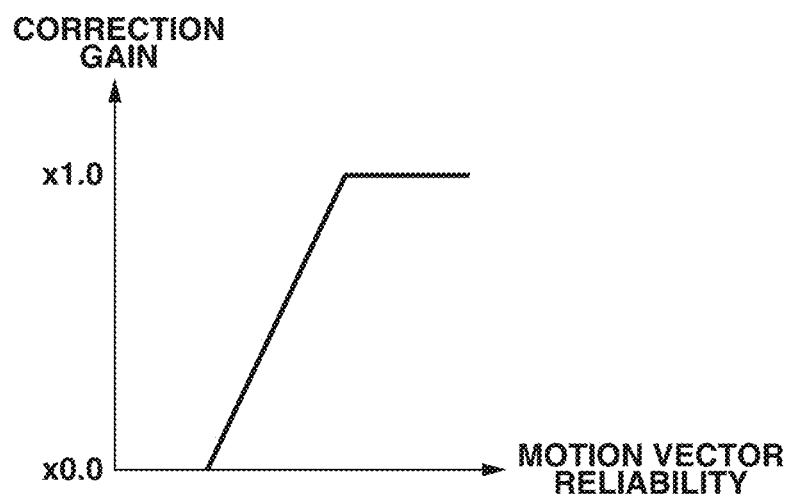

In the present exemplary embodiment, techniques of machine learning and deep learning such as position/orientation estimation techniques are used in combination with the motion vectors calculated based on differences in pixel values between frames, whereby the image capturing parameter is generated with great accuracy even for a swinging object. Further, a motion vector correction method that uses the reliability of the motion vector calculated in step S307 can be used. As illustrated in FIG. 9B, the motion vector is multiplied by a correction gain to obtain a gain amount of 1.0 at higher reliabilities. Further, in the present exemplary embodiment, the motion vector of the face region is multiplied by a correction gain to constantly obtain 1.0.

In step S309, the control unit 101 compares the size of the corrected motion vector output by the motion vector correction unit 205 with a predetermined threshold value. In a case where the size of the motion vector of the face region or the size of the motion vector of the club region is greater than the threshold value (YES in step S309), i.e., in a case where the face region where a motion blur is undesirable is moving or a case where the swinging object region where a motion blur is desirable is sufficiently moving, the processing proceeds to step S310. On the other hand, in a case where the motion vector is less than or equal to the threshold value (NO in step S309), the image data is updated, and the process from step S302 is repeated. A case where the motion vector 802 of the club region in FIG. 8 is greater than the threshold value will be described below in the present exemplary embodiment. Different values can be set as the threshold value to be compared with the motion vector of the face region and the threshold value to be compared with the motion vector of the swinging object region. The threshold value is desirably changed depending on a setting based on whether the user prioritizes the prevention of a subject motion blur and a camera shake, or prioritizes the enhancement of a motion blur in the swinging region. With the configuration in which the threshold values are set, images can be captured more flexibly as desired by the user. Further, different threshold values can be set for different types of sports. Specifically, golf and batting in baseball have a feature that a subject is less likely to change a standing position thereof by running or the like before and after a swing. Thus, a small value is set as the threshold value to be compared with the motion vector of the swinging region in order to prioritize the generation of a motion blur in the swinging region. In tennis and badminton, on the contrary, there may be a situation where the subject moves significantly during a swing. Thus, the prevention of the subject motion blur and the camera shake is prioritized, and a great value is set as the threshold value. With the foregoing configuration, the image capturing parameter is generated suitably for features of each sport among the swing sports, so that dynamic images can be captured with great accuracy. Further, the threshold value can be changed depending on how the subject and the digital camera 100 face each other. Specifically, in a case where images of a subject performing a golf swing are to be captured from the front as illustrated in FIG. 4, the size of the motion vector between frames often changes. Thus, a motion blur is likely to occur in the club region. However, in a case where images of the subject are to be captured from the back, the moving amounts in the horizontal and vertical directions in the images appear to be small. Thus, a looser (greater) threshold value than the threshold value in the image capturing from the front can be set. Specifically, it is effective to change the threshold value to be compared with the motion vector of the swinging region depending on the relative positional relationship between the subject and the image capturing apparatus.

Further, while the size of the motion vector between frames of two images is compared with the threshold value in the present exemplary embodiment, a result of accumulating the motion vector between a plurality of frames (vector accumulation result) can be compared with the threshold value. The motion vector can be continuously monitored from the start of the preparatory image capturing, so that an average motion is analyzed even in a case where the speed of the swinging object increases or decreases suddenly, and a stabler threshold value determination result is provided. Thus, the generated image capturing parameter is also stabilized, the possibility of success in capturing dynamic images increases, and the usability improves.

In step S310, the depth change detection unit 206 detects, under control of the control unit 101, a change in depth between images captured consecutively. The change in depth is detected by providing a defocus map as metadata in capturing the images. FIG. 10 illustrates a defocus map corresponding to the image 401 in FIG. 4. The defocus map indicates in-focus levels of an image capturing plane in a form of a grayscale map. The front, back, and in-focus are respectively indicated by white, black, and 50%-gray. It is evident that the person subject 403 is in focus and the bird 404 is closer to the background than the person subject 403 is. The defocus map is calculated by a known technique. For example, as discussed in Japanese Patent Application Laid-Open No. 2008-15754, the defocus map corresponding to the image capturing plane can be acquired from a phase difference image obtained from an image sensor including pixels all of which are phase difference pixels.

The depth change detection unit 206 calculates the distance distribution information (distance information calculation). The depth change detection unit 206 receives the coordinates of the face region generated by the region extraction unit 202 and calculates an average defocus amount of the face region. The depth change detection unit 206 further calculates an average defocus amount of the face region on a defocus map captured at the next time point. Then, the depth change detection unit 206 calculates a difference between the average defocus amounts at the different time points as a depth change amount.

In a case where a focus lens position remains the same at different time points, the depth change amount can be used as a moving amount by which the person subject 403 moves in a depth direction. In a case where the person subject 403 moves in the depth direction in a state where the focus lens position remains unchanged, a depth blur is generated in the face region of the person subject 403. The face region desirably includes neither a motion blur nor a depth blur, so that the image capturing parameter generation unit 207 described below reduces the aperture value as needed based on the depth change amount to increase the depth and to prevent the depth blur. The depth is increased if the aperture value is decreased, but this limits the amount of incoming light. Thus, in order to capture images at the same brightness, the ISO sensitivity is to be increased. However, in a case where the ISO sensitivity is excessively increased, random noise becomes noticeable, and the image quality decreases. Thus, it is not always desirable to reduce the aperture value immoderately. Thus, in the present exemplary embodiment, the aperture value is selected as suitable for a change in the subject motion for each scene so that images with higher quality are captured.

While a change in the depth direction is calculated from the defocus map in the present exemplary embodiment, the present exemplary embodiment is not limited to this configuration, and any information corresponding to a distance distribution in the depth direction of the subject in an image capturing range can be used. For example, a defocus amount distribution normalized using a depth of focus can be used, or a depth map indicating a subject distance of each pixel can be used. Further, two-dimensional information indicating phase differences (image displacement amounts that occur between different points of view) used in deriving defocus amounts can be used. Further, a map converted into actual distance information on the subject side via the focus lens position can be used. Specifically, any information indicating changes based on a distance distribution in the depth direction as well as those described above are applicable, and distribution information about parallax (parallax distribution information) can also be used.

In step S311, the image capturing parameter generation unit 207 generates, under control of the control unit 101, the image capturing parameter for capturing dynamic images of a subject playing a sport that involves a swing movement. Specifically, the image capturing parameter generation unit 207 generates a shutter speed value, an aperture value, and an ISO sensitivity value. First, the shutter speed is determined with reference to the size of the vector output by the motion vector correction unit 205. While the motion vector includes components in horizontal and vertical directions, only the component in the horizontal direction will be described below for simplification. As for the component in the vertical direction, the calculation can be performed using a similar method to a method used for the component in the horizontal direction.

A case where the image size in the horizontal direction is 2100 pixels and a motion blur corresponding to 200 pixels, which accounts for about 10% of the 2100 pixels, is desirable will be discussed below. In a case where the size of the vector output by the motion vector correction unit 205 is 100 pixels, since the frame rate is 120 frames per second, the shutter speed is set to 1/60 seconds to make it possible to capture images with a motion blur having a desired width.

Next, the aperture value is determined with reference to a change in depth between consecutively-captured images that is output by the depth change detection unit 206. Here, a value obtained by normalization of the defocus amount by the depth of focus (e.g., 1 Fδ, where F is the aperture value, and δ is a permissible confusion circle diameter, which is twice the pixel size in the present exemplary embodiment) is defined as a depth blur amount, and in a case where the depth blur amount exceeds 1.0 Fδ, an observer can recognize the occurrence of a blur. In a case where a change amount output by the depth change detection unit 206 is 0.05 mm, and if an aperture value F of 5.6 is selected, $0.05/(5.6 \times 5 \times 2 \times 10^{-3}) = 0.89$ Fδ is obtained, and the observer cannot recognize the occurrence of a depth blur.

Lastly, the ISO value of the ISO sensitivity is selected so that images are captured at appropriate brightness at the shutter speed of 1/60 seconds and the aperture value F of 5.6 with regard to the brightness in the image capturing environment. In a case where images are captured outside on a cloudy day and an exposure value (EV) is 11, since the shutter speed is 1/60 seconds, a time value (TV) is 6, and since the aperture value F is 5.6, an aperture value (AV) is 5. Since EV=TV+AV−SV, SV is 0, and the ISO sensitivity is determined to 100.

Figure 11:
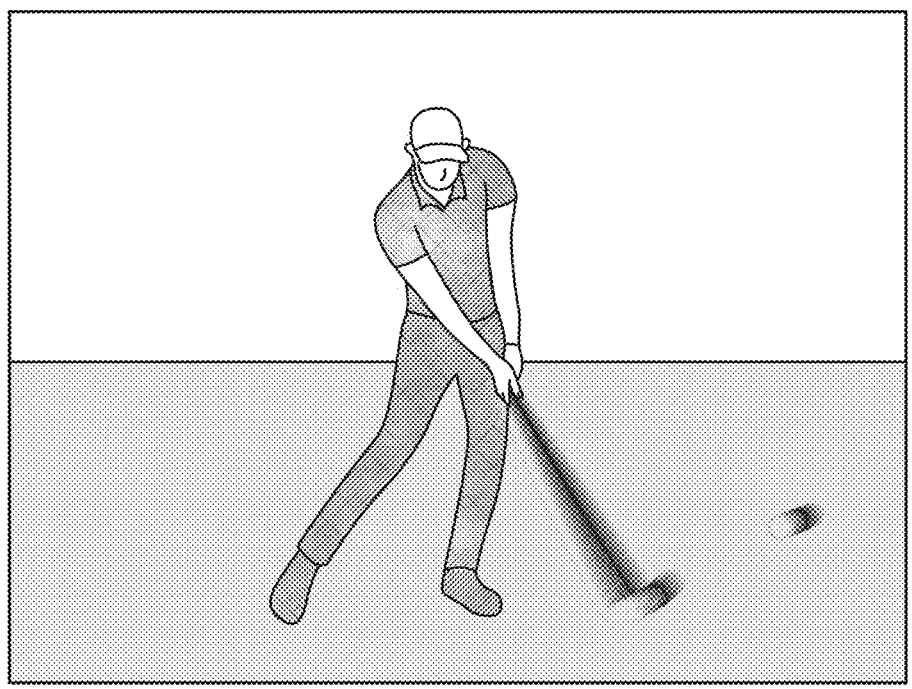
FIG. 11 is a diagram illustrating an image captured through main image capturing according to the first exemplary embodiment.

In step S312, the control unit 101 performs main image capturing based on the image capturing parameter determined in step S311 and records images captured through the main image capturing in the recording medium 108, and the process is ended. FIG. 11 illustrates an image captured through the main image capturing. Neither a motion blur nor a depth blur occurs in a face portion of a person subject. On the other hand, a motion blur occurs in a club region. Thus, a dynamic image is successfully captured.

While the defocus map is generated based on a group of images in a relationship of including parallax (a group of images in a relationship of having a different point of view from each other) in the present exemplary embodiment, the present exemplary embodiment is not limited to this method, and any method that can handle captured images and can acquire a distance distribution of a subject in the image capturing range can be used.

As to a defocus map generation method, for example, a depth-from-defocus (DFD) method that derives a defocus amount from a correlation between two images each having a different focus or a different aperture value from the other can be used. Alternatively, the distance distribution of a subject can be derived using information relating to an actual distance distribution measured by a distance measuring sensor module using a time-of-flight (TOF) method. Alternatively, contrast distribution information about captured images using a contrast distance measurement method can be used.

A second exemplary embodiment of the present disclosure will be described below. The below-described exemplary embodiment is an image capturing apparatus, as in the first exemplary embodiment, and an example where the present disclosure is applied to a digital camera as an example of the image capturing apparatus will be described below.

In the first exemplary embodiment, the image capturing parameters are controlled to capture dynamic images. In the present exemplary embodiment, a plurality of images is combined to generate an image that has both a dynamic expression by long exposure image capturing and a static expression with a locally-reduced subject blur.

The digital camera according to the second exemplary embodiment of the present disclosure has a configuration similar to the configuration thereof illustrated in the block diagram in FIG. 1 according to the first exemplary embodiment, so that redundant descriptions thereof are omitted. A user can select an image capturing mode dedicated to the first exemplary embodiment or an image capturing mode dedicated to the present exemplary embodiment for each image capturing scene by operating the operation input unit 110 or the like of the image capturing apparatus. Alternatively, the image capturing apparatus can be configured to automatically determine a scene and select an image capturing mode.

The present exemplary embodiment is different from the first exemplary embodiment in that the image processing unit 107 includes an image combining processing unit 1200 as illustrated in FIG. 12. A process of the image combining processing unit 1200 will be described in detail below.

Figure 13A:
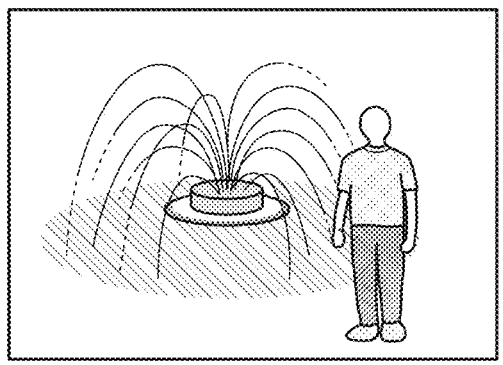
FIGS. 13A, 13B, 13C, 13D, 13E, and 13F are diagrams illustrating a combining map according to the second exemplary embodiment.

The present exemplary embodiment is intended to capture images of a scene where a moving object (such as a fountain, a waterfall, or a flow of people) is in the background and a person being a main subject is in the foreground as illustrated in FIG. 13A. In this scene, it is intended to capture an image including the background with a dynamic impression corresponding to the long exposure image capturing and a person region with a reduced blur. Further, it is also intended to generate an image with a dynamic impression achieved by addition of a motion locus in a scene where the main subject is moving. In FIG. 12, the image combining processing unit 1200 includes an image accumulation unit 1201, a main subject region extraction unit 1202, a main subject related feature detection unit 1203, a combining characteristic control unit 1204, and an averaging/combining unit 1205. Further, functions of the respective units of the image combining processing unit 1200 are performed under instructions from the control unit 101.

The image combining processing unit 1200 accumulates raw image data captured by the image capturing unit 105 or image data having undergone development processing, in the image accumulation unit 1201 in an amount that corresponds to a predetermined number of frames. Consecutive frames without a non-exposure period between the frames are input as input images. The image data accumulated in the image accumulation unit 1201 is input to the averaging/combining unit 1205, and averaging processing is performed on the plurality of frames in units of pixels to thereby generate an image corresponding to long exposure image.

The number of frames to be accumulated in the image accumulation unit 1201 is determined based on the shutter speed set by the user and the shutter speed at which the image capturing is performed.

In the present exemplary embodiment, the shutter speed at which the image capturing is performed is fixed to 1/100 seconds.

In a case where the shutter speed is set to 1/2 seconds by the user, the number of frames to be captured and accumulated is 50. Then, fifty frames of images at the shutter speed of 1/100 seconds are averaged to thereby generate an image that includes an accumulated blur corresponding to 1/2 seconds and is as bright as an image of 1/100 seconds.

The image data accumulated in the image accumulation unit 1201 is output to the main subject region extraction unit 1202 and also to the main subject related feature detection unit 1203.

Figure 13B:
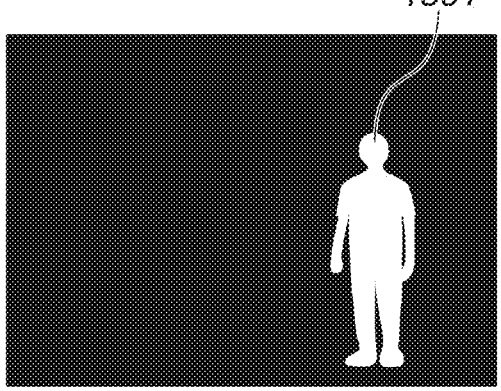

The main subject region extraction unit 1202 extracts a region of a main subject and outputs the extracted region as a main subject region map. The main subject is extracted using a known method such as machine learning. A case where a region of a person is extracted as the main subject according to the present exemplary embodiment will be described below as an example. FIGS. 13A to 13F illustrate an example of the main subject region map. FIG. 13A illustrates an image input to the main subject region extraction unit 1202. FIG. 13B illustrates an extracted main subject (person) map where a main subject region 1301 has a signal of 1 (white) whereas a background region has a signal of 0 (black). The extracted main subject region map is output to the main subject related feature detection unit 1203 and the combining characteristic control unit 1204.

Further, the main subject region extraction unit 1202 also calculates position information about the main subject. For example, a position of a head portion of the person or the center of gravity of the body of the person is used as the position of the main subject. The main subject region extraction unit 1202 generates the main subject region map and calculates the position of the main subject for the plurality of frames accumulated in the image accumulation unit 1201.

Figure 13C:
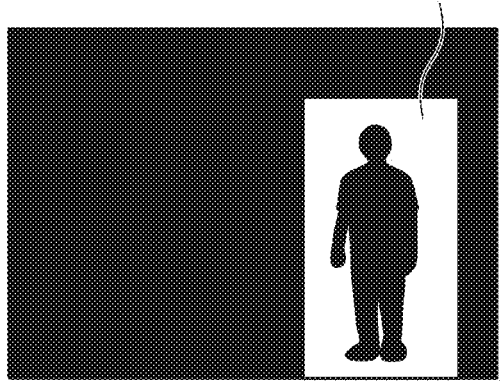

The main subject related feature detection unit 1203 detects an amount of motion of the main subject region and an amount of motion of a main subject background region between the frames (motion amount detection). The main subject background region is set based on the input main subject region map. The main subject background region is a background region around the main subject. FIG. 13C illustrates an example of the main subject background region. In FIG. 13C, a region 1302 in white is the main subject background region. The main subject related feature detection unit 1203 calculates absolute values of differences between the plurality of frames accumulated in the image accumulation unit 1201 for the main subject region 1301 and the main subject background region 1302 and normalizes the calculated absolute values using a predetermined area. This is used as an indicator for detecting the presence or absence of a motion blur in the main subject and the presence or absence of a moving subject in the main subject background region.

Figure 13D:
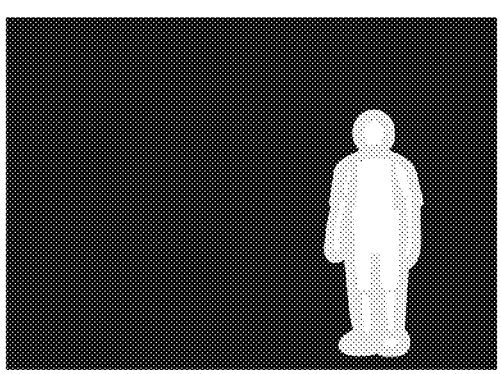

The combining characteristic control unit 1204 determines combining characteristics of the averaging/combining unit 1205 based on the main subject region map information and the main subject position information that are output from the main subject region extraction unit 1202 and the motion information about the main subject and the motion information about the background region that are output from the main subject related feature detection unit 1203. Details of a process of the combining characteristic control unit 1204 will be described below. The combining characteristic control unit 1204 outputs a combining map for use in combining and combining order information as combining information. FIG. 13D illustrates an example of the combining map.

The averaging/combining unit 1205 performs averaging processing on images output by the image accumulation unit 1201 based on the combining information output by the combining characteristic control unit 1204. At this time, the number of frames to be combined is changed for each pixel based on the combining map, whereby an image in which a shutter speed is different for each region is generated. In the present exemplary embodiment, the number of images to be averaged for the main subject region is reduced to output a pixel of a short shutter speed, whereas the number of images to be averaged and combined for the background region is increased to output a pixel of a long shutter speed corresponding to a long exposure image.

A process of the image combining processing unit 1200 is described above. The image data generated as described above is recorded in the recording medium 108, or in a case where the image data is raw data, a development processing unit of the image processing unit 107 performs development processing on the raw data.

Next, details of a process of the combining characteristic control unit 1204 will be described below with reference to a flowchart in FIG. 14.

In step S1401, the combining characteristic control unit 1204 sets a short exposure standard frame. The averaging/combining unit 1205 generates an image containing both a pixel corresponding to a long exposure pixel and a pixel corresponding to short exposure pixel based on the combining information as described above. At this time, the shortest exposure pixel may not be combined and may be output as an image of a single frame. The frame used as the shortest exposure pixel is the short exposure standard frame.

Figure 15A:
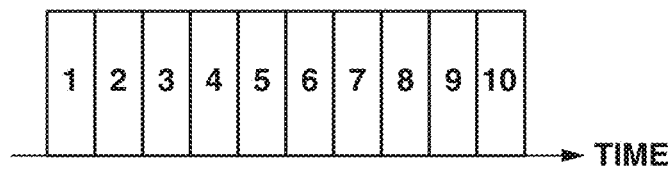
FIGS. 15A, 15B, 15C, 15D, 15E, and 15F are diagrams illustrating a short exposure standard frame and a combining order according to the second exemplary embodiment.

A specific example of the short exposure standard frame will be described below. FIG. 15A illustrates images accumulated in the image accumulation unit 1201. A horizontal axis indicates a time axis representing the image capturing time and indicates that ten images of frames 1 to 10 captured in the order of 1 to 10 are accumulated.

As to pixels corresponding to long exposure pixels and generated by the averaging/combining unit 1205, all the images of the ten frames 1 to 10 are averaged to generate an image including an accumulation blur amount corresponding to long exposure image capturing of ten frames and having the same brightness as the images before being combined. As to short exposure pixels, the pixels of the short exposure standard frame are directly output. Whether the averaging/combining unit 1205 is to output the short exposure pixels or the pixels corresponding to long exposure image capturing is determined using the combining map illustrated in FIG. 13D.

The combining map illustrated in FIG. 13D has signals of 0 to 1, and in a case where a signal is 0, the averaging/combining unit 1205 outputs the pixel corresponding to the long exposure pixel generated by combining the maximum number of images, whereas in a case where a signal is 1, the averaging/combining unit 1205 outputs the pixel of short exposure standard frame. Each signal value M of the combining mask has an intermediate value that satisfies 0<M<1, and for the intermediate value, the number N of images to be combined is determined using the following formula:

$N = (\text{Max} - 1) \times (1 - M) + 1$, where Max is the maximum number of frames to be combined. For example, in a case where Max=10 and M=0.8 for a pixel, N=2, and an average signal of two images is output.

A short exposure standard frame can be selected from any frames for use in combining and is determined using a flowchart described below.

Figure 15B:
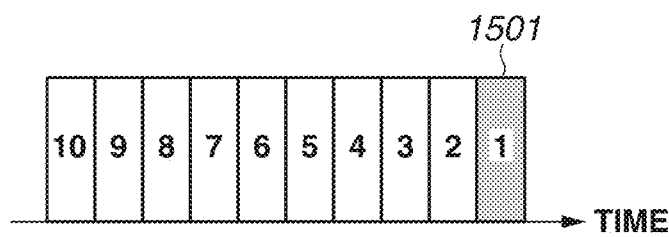
Figure 15C:
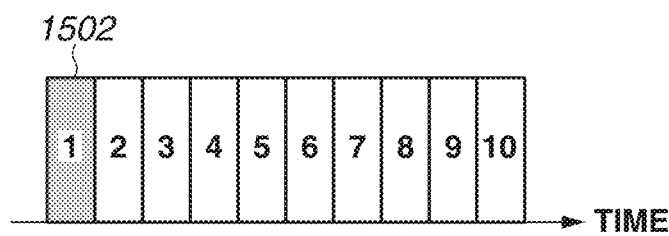
Figure 15D:
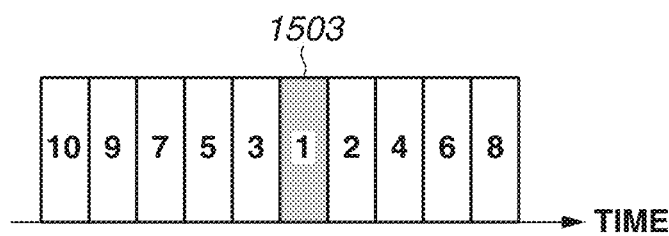

FIG. 15B illustrates an example of a case where a frame 1501 captured temporally the last is the short exposure standard frame. Similarly, FIG. 15C illustrates an example of a case where a frame 1502 captured temporally the first is the short exposure standard frame, and FIG. 15D illustrates an example of a case where a sixth captured frame 1503 is the short exposure standard frame.

Figure 16:
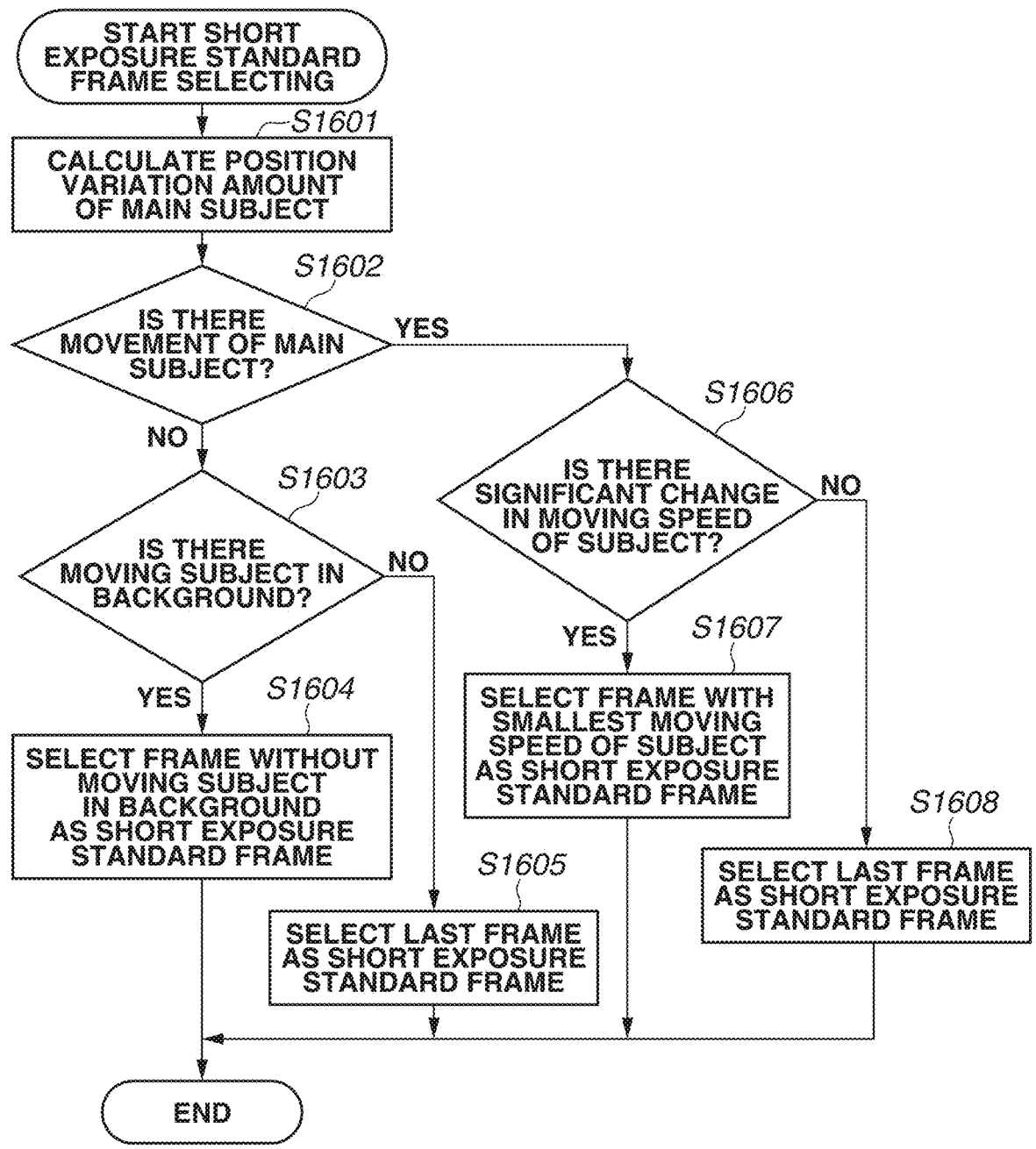
FIG. 16 is a flowchart illustrating a short exposure standard frame determination method according to the second exemplary embodiment.

A short exposure standard frame setting method will be described below with reference to a flowchart in FIG. 16.

Figure 17A:
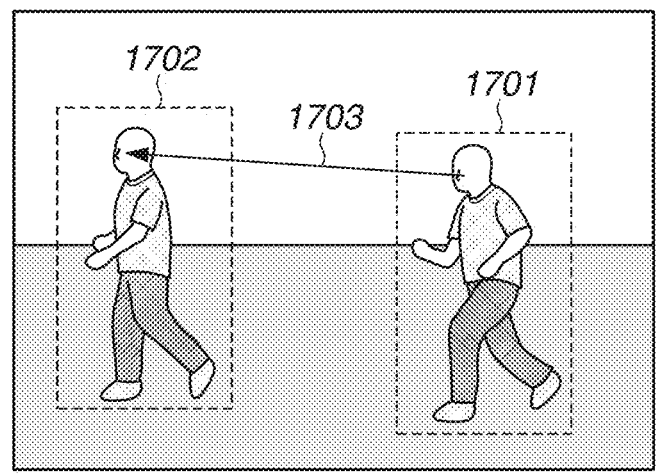
FIGS. 17A, 17B, and 17C are diagrams illustrating a moving state of a main subject and an object according to the second exemplary embodiment.

In step S1601, the main subject region extraction unit 1202 acquires main subject position information about each frame and calculates a position variation amount of the main subject between a first frame and a last frame. FIG. 17A illustrates an example of the position variation amount. A position 1701 is a position of a main subject in the first frame. A position 1702 is a position of the main subject in the last frame. An arrow 1703 indicates the position variation amount.

In step S1602, the main subject related feature detection unit 1203 determines whether there is a movement of the main subject between the accumulated frames. Specifically, in a case where the position variation amount of the main subject that is calculated in step S1601 by the main subject region extraction unit 1202 is greater than a threshold value TH1, the main subject related feature detection unit 1203 determines that there is a movement, whereas in a case where the position variation amount is less than the threshold value TH1, the main subject related feature detection unit 1203 determines that there is not a movement. In a case where the main subject related feature detection unit 1203 determines that there is not a movement of the main subject (NO in step S1602), the processing proceeds to step S1603, whereas in a case where the main subject related feature detection unit 1203 determines that there is a movement (YES in step S1602), the processing proceeds to step S1606.

In step S1603, the main subject related feature detection unit 1203 determines whether the output background region motion information is greater than a threshold value TH2. The background region motion information is calculated between the plurality of frames, and in a case where at least one motion between the frames is greater than the threshold value TH2, the main subject related feature detection unit 1203 determines that there is a motion. In a case where the main subject related feature detection unit 1203 determines that there is a motion in the background (YES in step S1603), the processing proceeds to step S1604, whereas in a case where the main subject related feature detection unit 1203 determines that there is not a motion (NO in step S1603), the processing proceeds to step S1605.

Figure 15E:
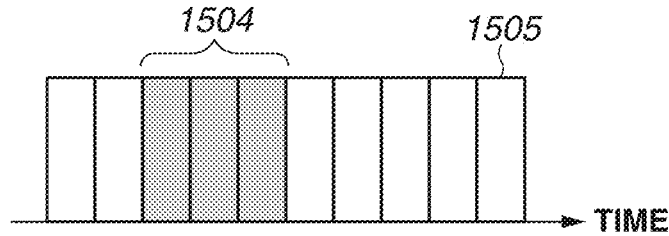
Figure 17B:
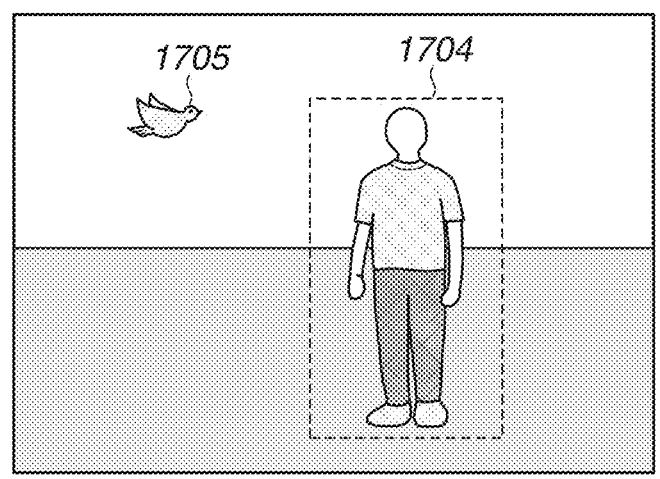
Figure 17C:
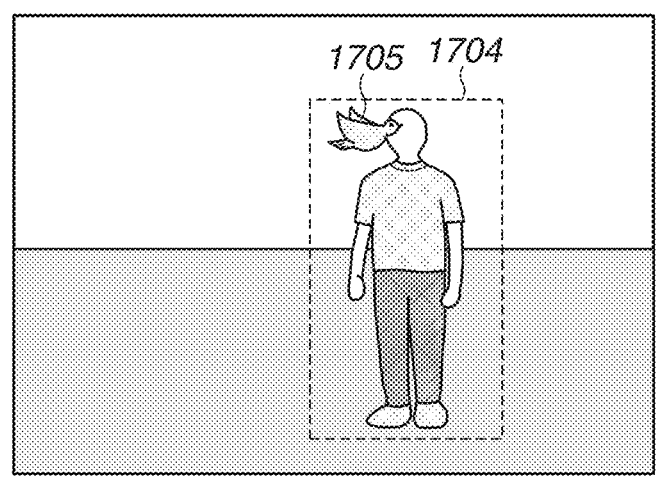

In step S1604, the combining characteristic control unit 1204 selects a frame without a moving subject in the background as the short exposure standard frame. A scene where there is a motion in the background will be described below with reference to FIGS. 17B and 17C. In FIGS. 17B and 17C, a background region 1704 indicates a region of the background of the person, and a moving object 1705 indicates a moving object (bird) other than the person. In a case where no subjects other than a person are in the background region 1704 of the person as in FIG. 17B, the motion amount of the background region is small, and in a case where the bird moves and enters the background region 1704 as in FIG. 17C, the motion amount increases. In this case, the short exposure standard frame is selected from frames excluding the frame having a great motion amount of the background region. Specifically, the combining characteristic control unit 1204 selects a frame that is temporally the most distant frame from the frame having the great motion amount as the short exposure standard frame. FIG. 15E illustrates an example. In FIG. 15E, a group of frames 1504 indicates a plurality of frames having a motion amount greater than the threshold value TH2. In this example, a frame 1505, which is temporally the most distant frame from the group of frames 1504 having a great motion, is selected as the short exposure standard frame. Note that in a state where the background region is constantly moving as in the example of the fountain in FIG. 13A, the last frame or a frame with the smallest motion amount is selected as the short exposure standard frame.

By the above-described control, for example, an image that is difficult to use as a static frame, e.g., a bird overlaps a person region in which a motion is intended to be stopped, is prevented from being selected as the short exposure standard frame.

While the short exposure standard frame is determined based only on the motion amount of the background region in the above-described example, the motion amount of the person region can also be considered in addition to the motion amount of the background region in the determination. Further, object detection can be performed in addition to the determination based on the motion amount, and a frame without an object other than the main subject near the background region and the main subject region can be selected as the short exposure standard frame.

Step S1605 is a case where there is not a moving subject in the background. In this case, since no significant negative effects are likely to be produced regardless of which frame is selected as the short exposure standard frame, a predetermined frame (e.g., the last frame) is selected as the short exposure standard frame.

Figure 18A:
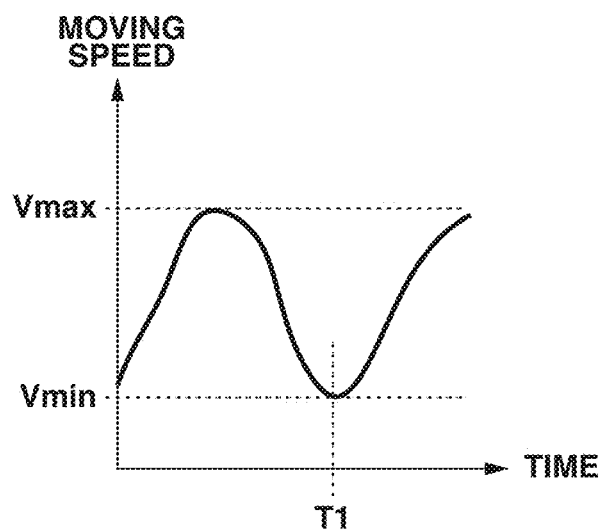
FIGS. 18A and 18B are diagrams illustrating a change in a moving speed of a main subject over time according to the second exemplary embodiment.
Figure 18B:
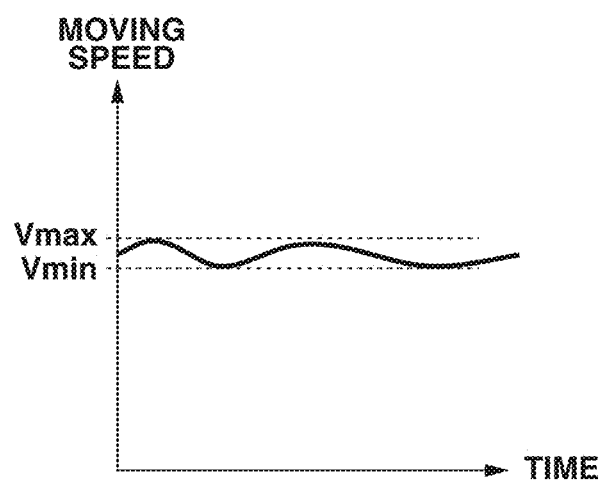

In step S1606, the main subject related feature detection unit 1203 determines whether there is a change in a moving speed of the subject in a case where the subject is moving. FIGS. 18A and 18B are graphs illustrating the moving speed of the subject over time. The moving speed of the main subject is calculated from a position variation amount between a plurality of captured frames. Further, a maximum value Vmax and a minimum value Vmin of the moving speed are calculated.

In a case where a difference between the maximum value Vmax and the minimum value Vmin is greater than or equal to a threshold value TH3, the main subject related feature detection unit 1203 determines that there is a change in the moving speed of the subject, whereas in a case where the difference is less than the threshold value TH3, the main subject related feature detection unit 1203 determines that there is not a change in the moving speed of the subject. FIG. 18A illustrates an example of a case where there is the change in the moving speed, and FIG. 18B illustrates an example of a case where there is not the change in the moving speed. A case where there is a significant change in the moving speed is a scene where there are high and low speeds during a motion, such as a case where a person as the main subject jumps or is on a swing. In a case where the main subject related feature detection unit 1203 determines that there is the change in the moving speed (YES in step S1606), the processing proceeds to step S1607, whereas in a case where the main subject related feature detection unit 1203 determines that there is not the change in the moving speed (NO in step S1606), the processing proceeds to step S1608.

In step S1607, the combining characteristic control unit 1204 selects a frame with the smallest moving speed of the subject as the short exposure standard frame. In the example illustrated in FIG. 18A, a frame captured at time T1, at which the moving speed is lowest, is selected as the short exposure standard frame. Use of the time at which the moving speed becomes the lowest as the short exposure standard frame makes it possible to generate a crisp image including both a dynamic region and a static region.

In step S1608, the combining characteristic control unit 1204 selects the last captured frame as the short exposure standard frame. This makes it possible to generate an image indicating a motion locus of the main subject.

A short exposure standard frame selecting method has been described above. While the short exposure standard frame is selected based on the motion information about the main subject, the motion information about the background of the main subject, and the movement information about the main subject in the above-described example, the short exposure standard frame can be selected using any information relating to the main subject. For example, based on distance information about the main subject, a frame with the greatest (shortest) distance can be selected as the short exposure standard frame.

Figure 14:
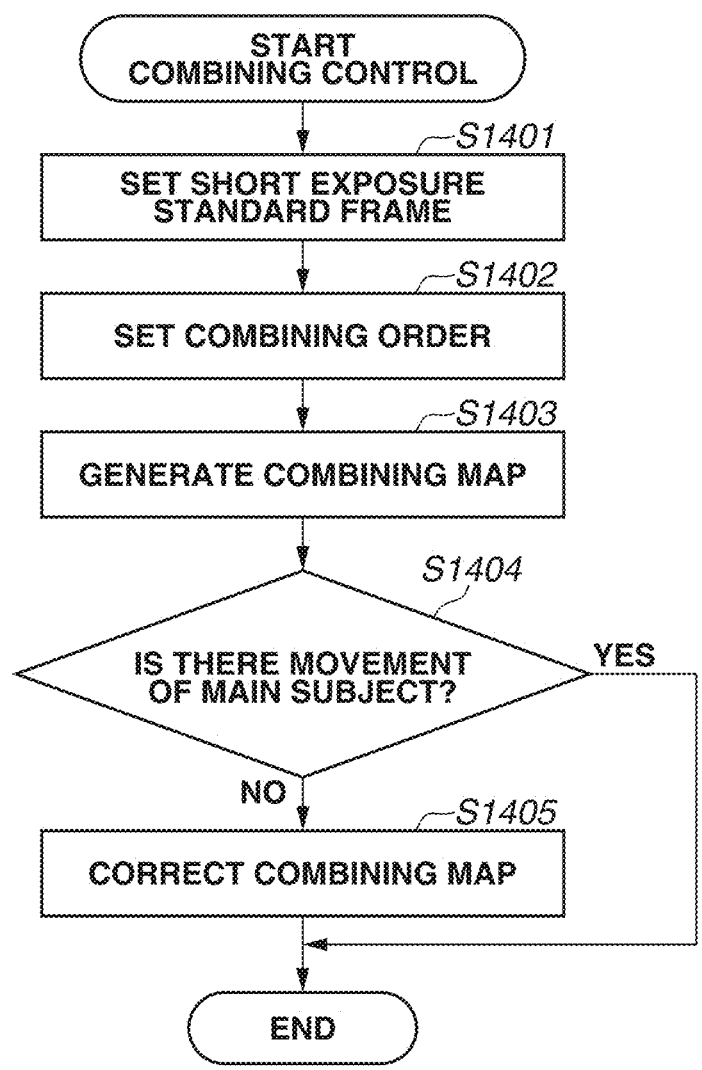
FIG. 14 is a flowchart illustrating a combining characteristic determination method according to the second exemplary embodiment.

Back to FIG. 14, in step S1402, a combining order is set based on the short exposure standard frame. FIGS. 15B to 15D illustrate an example of the combining order.

Numbers specified in the frames in FIGS. 15B to 15D indicate the combining order. The frame with the combining order of 1 indicates the short exposure standard frame. As described above, the averaging/combining unit 1205 performs averaging/combining on a plurality of frames, and the combining order indicates the order of use of the frames in the averaging/combining. For example, in a case where the number of images to be combined is three, three images of the frames 1 to 3 are combined together, whereas in a case where the number of images to be combined is five, the frames 1 to 5 are combined together.

In step S1402, the combining characteristic control unit 1204 sets the combining order as illustrated in FIGS. 15B to 15D. As to an order setting method, the short exposure standard frame is used as a standard, and the combining order of the frames is set in order of frames temporally close to the short exposure standard frame. In a case where a difference in time from a previous frame and a difference in time from a subsequent frame are equal, the subsequent frame is prioritized.

FIGS. 15B to 15D illustrate an example where the combining order is set as described above. FIG. 15B illustrates a combining order in a case where the last frame is the short exposure standard frame. FIG. 15C illustrates a combining order in a case where the first frame is the short exposure standard frame. FIG. 15D illustrates a combining order in a case where the sixth frame from the first frame is the short exposure standard frame.

In step S1403, a combining map as illustrated in FIG. 13D is generated based on the main subject region map output by the main subject region extraction unit 1202. Since the main subject region map is binary data of 0 and 1, a low-pass filter is applied to the main subject region map to generate a map having intermediate values of 0 to 1, and the generated map is used as the combining map.

In step S1404, as in step S1602 described above, the main subject related feature detection unit 1203 determines whether there is a movement of the main subject between frames. In a case where there is not a movement of the main subject (NO in step S1404), the processing proceeds to step S1405, whereas in a case where there is a movement of the main subject (YES in step S1404), the process is ended.

Figure 13E:
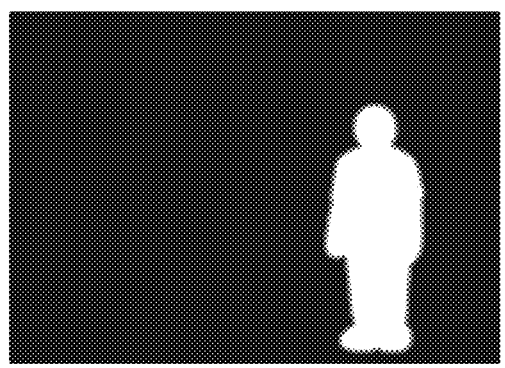
Figure 19A:
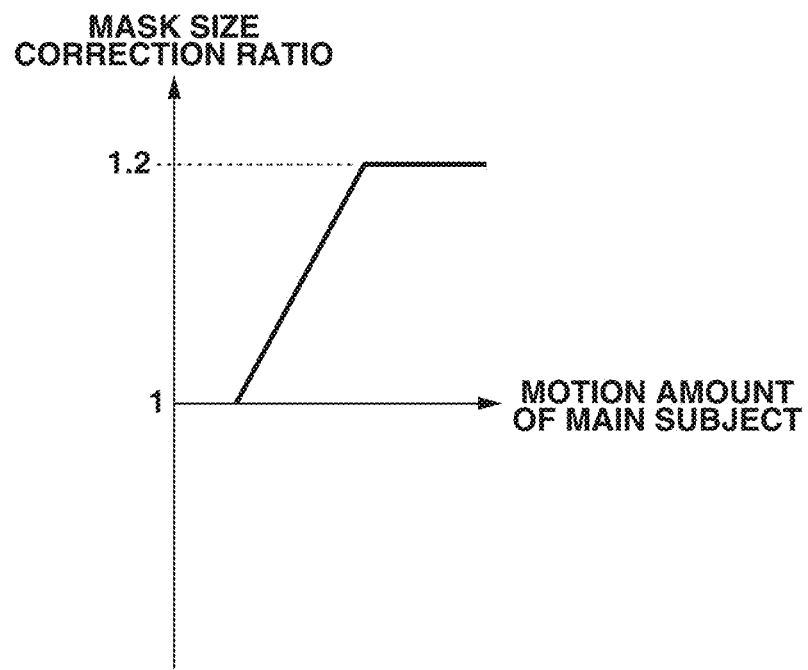
FIGS. 19A and 19B are diagrams illustrating motion amounts and combining mask correction ratios according to the second exemplary embodiment.
Figure 19B:
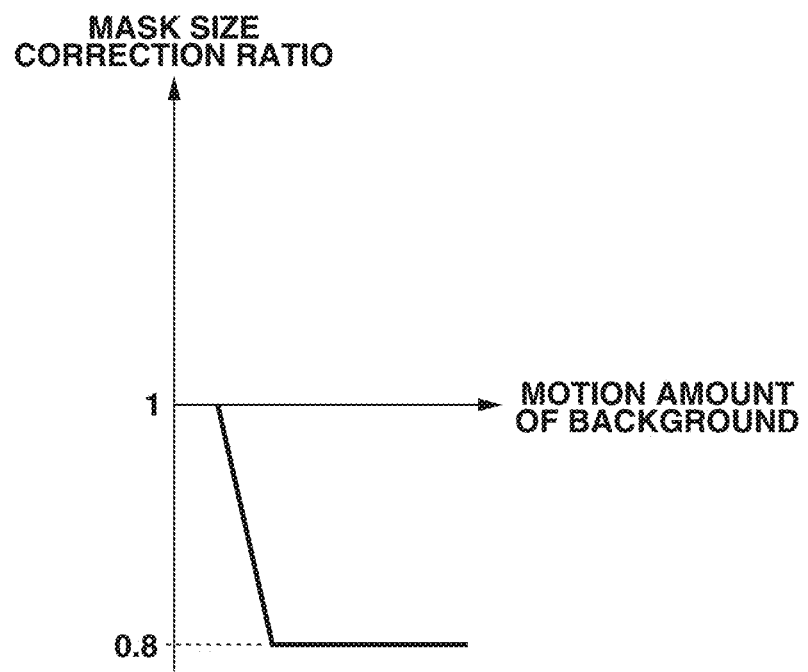

In step S1405, the combining characteristic control unit 1204 corrects the combining map generated in step S1403 based on the motion of the main subject and the motion of the background. A correction method will be described below with reference to FIGS. 19A and 19B. FIGS. 19A and 19B are diagrams illustrating the motion amount of the main subject region and the motion amount of the background region of the main subject, respectively, and mask correction ratios. A mask correction ratio indicates an expansion/contraction ratio of the combining mask, and a value greater than one indicates expansion whereas a value less than one indicates contraction. FIG. 19A illustrates a relationship between the motion amount of the main subject region and the combining mask size correction ratio, and a correction coefficient is calculated that corrects the combining mask so that the combining mask is expanded at greater motion amounts of the main subject region. FIG. 13E illustrates an example where the combining mask is expanded using the combining mask in FIG. 13D as a standard. In a case where the main subject does not change in position but has a motion, performing averaging/combining causes a motion blur portion to extend beyond an outline of the subject. Thus, a combining range is expanded to produce an effect that a short exposure image is output also for an outline portion with a blur to prevent the outline portion from being blurred.

Figure 13F:
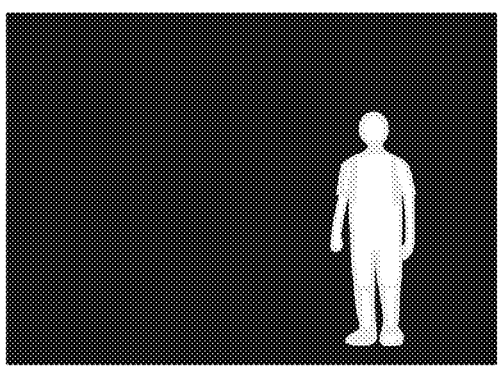

On the other hand, FIG. 19B illustrates a relationship between the motion amount of the background region of the main subject and the mask size, and a correction coefficient is calculated that corrects the combining mask so that the combining mask is contracted at greater motion amounts of the background region. FIG. 13F illustrates an example where the combining mask is contracted using the combining mask in FIG. 13D as a standard. This corresponds to a case where the main subject does not change in position but there is a motion in the background such as a fountain, a waterfall, or a flow of people. In the case where there is a motion in the background, combining images with a displacement from the main subject region generates an image with the motion of the background being static only around the outline of the main subject. In order to prevent such an image, the combining is controlled to attempt to combine only the inside of the main subject.

After the mask correction coefficient based on the motion of the main subject region and the mask correction coefficient based on the motion of the background region of the main subject are calculated as described above, the two mask correction coefficients are multiplied together to thereby calculate a final mask correction coefficient.

While an example of a combining mask correction method that expands/contracts the combining mask is described above, any method for correcting a combining mask based on a feature of a main subject can be used. For example, the combining characteristic control unit 1204 can perform correction to control the steepness of gradations of the combining mask. In this case, the correction can be controlled so that, in a case where there is a motion in the background, the combining mask has steep gradations, whereas, in a case where there is no motion in the background, the gradations are moderate. This makes a difference in motion blur between the main subject region and the background region less noticeable.

The configuration of the present exemplary embodiment has been described above. With the configuration according to the present exemplary embodiment, a plurality of images is combined together to generate an image that provides both a dynamic expression by long exposure image capturing and a static expression with a locally-reduced subject blur.

While an example where the number and order of images to be used in the averaging processing by the averaging/combining unit 1205 according to the present exemplary embodiment is described above, any other configuration that combines a plurality of images together can also be used. For example, a configuration may be employed where an image corresponding to a long exposure image, obtained by averaging all accumulated images, is generated in advance and a short exposure standard image is partially combined with the image corresponding to the long exposure image.

Figure 15F:
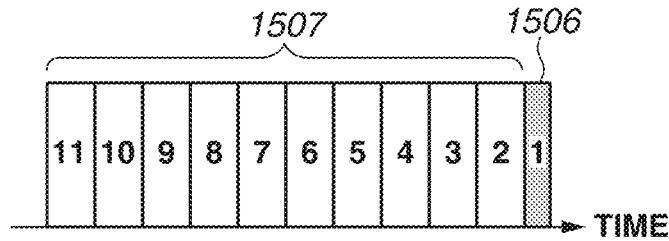

Further, while all images are captured at the same shutter speed in the examples of cases according to the above-described exemplary embodiments, a configuration may be employed where some images are captured at a different shutter speed. FIG. 15F illustrates a plurality of consecutively-captured image frames accumulated in the image accumulation unit 1201. A frame 1506 indicates the last frame and is captured at a shutter speed that is half the shutter speed of other frames 1507. An image corresponding to a long exposure image is generated by averaging/combining all the eleven frames. The frame 1506 is used as the short exposure standard frame. At this time, since the exposure of the frame 1506 is a half, the frame 1506 multiplied by a double gain is used. Further, the combining characteristic control unit 1204 can select whether to use the frame 1503 at a lower shutter speed or another frame of the same brightness as the short exposure standard frame based on the motion amount of the main subject.

As described above, images captured at different shutter speeds are used in combination. This makes it easy to generate an image with a locally-reduced blur in a case where the subject changes in position at high speed or there is a significant motion blur.

A third exemplary embodiment will be described below with reference to FIGS. 20 to 24. In the third exemplary embodiment, the image capturing method according to the first exemplary embodiment or the image capturing method according to the second exemplary embodiment is selected depending on an image capturing situation.

The image capturing method according to the first exemplary embodiment captures a single image (single-image acquisition) by one-time exposure so that the captured image includes both a portion with a reduced subject blur and a portion with an allowed or enhanced subject blur (hereinafter, the capturing will be referred to as "single-image capturing").

On the other hand, the image capturing method according to the second exemplary embodiment captures a plurality of images by a plurality of times of exposure, and generates an image using, for a portion where a subject blur is intended to be reduced, a single less-blurred image portion among the plurality of images and, for a portion where the subject blur is intended to be allowed or enhanced, a combination of a plurality of images (plurality-of-image combining). Furthermore, the method changes the above-described less-blurred image portion into a blurred image by combining a plurality of images to generate an image including both a portion with a reduced subject blur and a portion with an allowed or enhanced subject blur (hereinafter, the capturing will be referred to as "plurality-of-image capturing").

In the single-image capturing, once an intended shutter speed is determined, an image is captured by one-time exposure, and post image processing such as development is easily performed, so that the captured image is displayed promptly after being captured.

The single-image capturing, however, performs exposure at a shutter speed at which a sufficient blur amount can be obtained in a region where a blur is to be intended (the swinging region according to the first exemplary embodiment), so that in a case where there is a motion in a region where a blur is to be reduced (the face region according to the first exemplary embodiment) during the exposure period, a blur corresponding to the motion amount is generated. In a case where the motion amount is within an allowable range, the single-image capturing is adequate. In an attempt to capture a delicate expression in a face image, however, an image with even a slight motion amount may be regarded as a blur image, and an overall image may be determined as an unsatisfactory image. For example, an image with a blurred club region and a static face region as illustrated in FIG. 11 is supposed to be acquired as described above according to the first exemplary embodiment.

In a case where the face region moves even slightly during the exposure period, however, the face region may be blurred as illustrated in FIG. 23 and become unclear.

Figure 24:
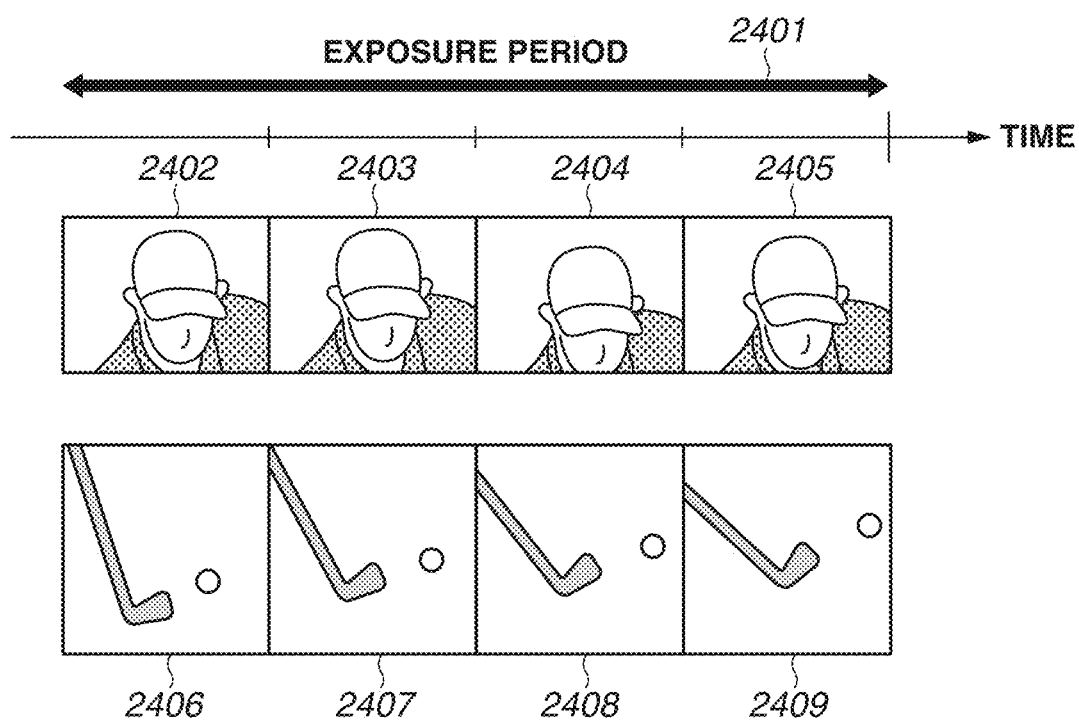
FIG. 24 is a diagram illustrating details of the image in a case where the face image is blurred.

This will be described below with reference to FIG. 24. In FIG. 24, a horizontal axis represents time, and a two-headed arrow 2401 indicates the exposure period (period corresponding to the shutter speed) described above according to the first exemplary embodiment.

Regions 2402 to 2405 are enlarged face regions of the subject during the exposure period. Similarly, regions 2406 to 2409 are enlarged regions of the swinging club during the exposure period. As illustrated in FIG. 24, the club is moved by swinging during an exposure period 2401, so that images are captured with a blur as illustrated in FIG. 23. Thus, the dynamic images are acquired. Further, as to the face region, in a case where the face region is perfectly still during the exposure period 2401, an dynamic image in which the face image is clear and only the club is blurred as illustrated in FIG. 11 is acquired. The face, however, often moves. Specifically, there may be a case where a face image moves slightly as illustrated in the regions 2402 to 2405 in FIG. 24. In this case, an image of the club gives a dynamic feel while the face image is blurred as illustrated in FIG. 23. In this situation, the set exposure time (shutter speed) can be reduced to capture a clear image of the face. This, however, results in a static image of the club and makes it difficult to acquire a dynamic image that is originally intended.

On the contrary, in a case where the plurality-of-image capturing is performed, the face image is captured during a shorter exposure time than the exposure period as described above in the second exemplary embodiment, so that a face image (corresponding to the short exposure frame according to the second exemplary embodiment) with a still and clear face image is easily acquired. Further, a blurred image of the swinging club region is obtained from a plurality of captured images combined together. Then, the blurred image of the club region and the face image are combined together to obtain a dynamic image. It is, however, difficult to display a final image immediately after an end of the exposure period because it takes time to combine the plurality of images together to generate the final image.

Further, in a case where the combining processing is performed every time, a device using a battery is constantly in a high power consumption state. This produces a negative effect that the lifetime of the battery decreases.

Thus, in the present exemplary embodiment, the single-image capturing or the plurality-of-image capturing is selected based on a motion state of an image portion where a blur is intended to be reduced, and the selected capturing is performed, whereby an image including both a portion where a subject blur is reduced and a portion where the subject blur is allowed or enhanced is efficiently generated.

Figure 20:
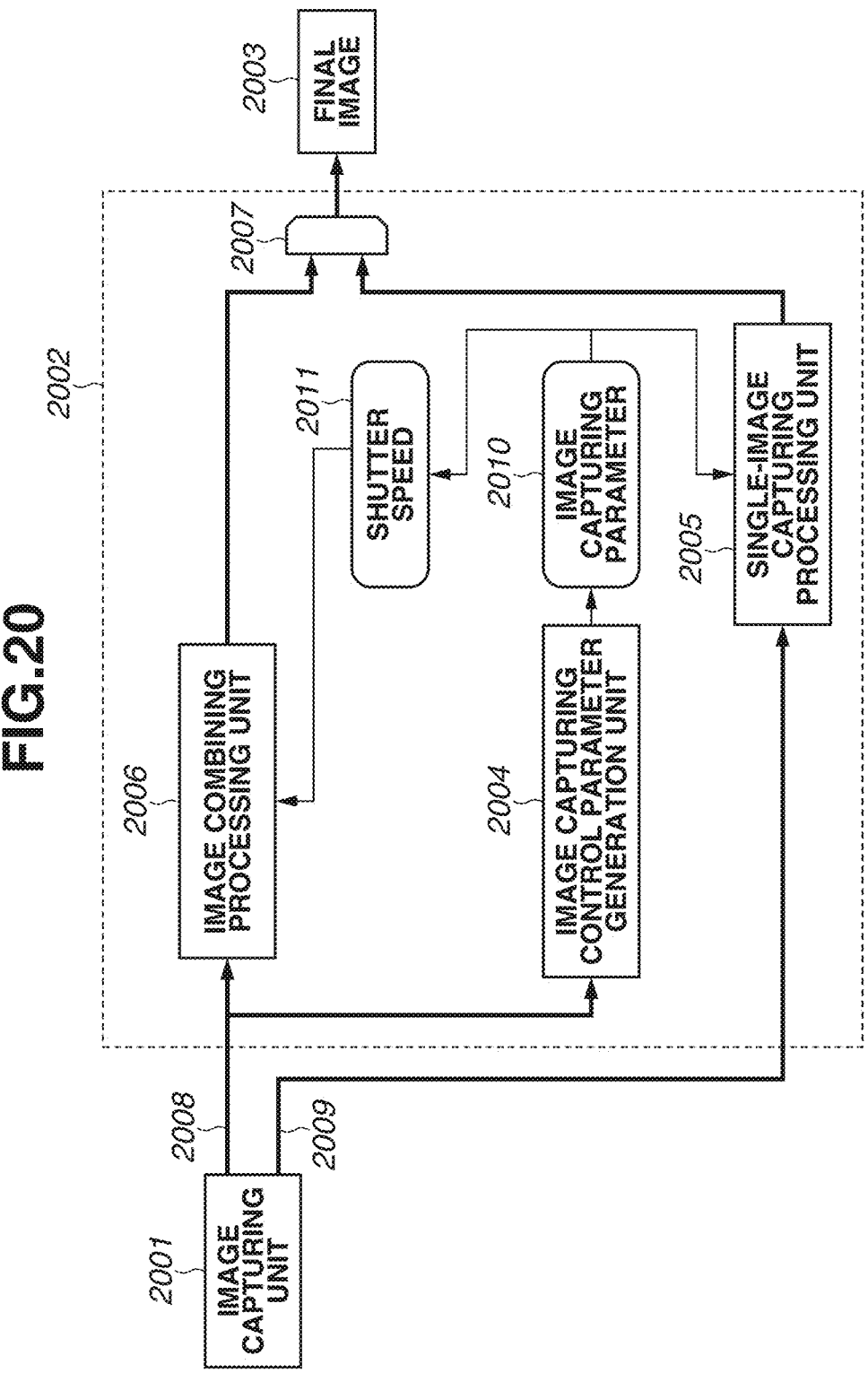
FIG. 20 is a diagram illustrating a configuration of processing units for image capturing according to a third exemplary embodiment.

FIG. 20 illustrates a configuration of processing units for image capturing according to the third exemplary embodiment. In FIG. 20, an image capturing unit 2001 corresponds to the image capturing unit 105 in FIG. 1 according to the first exemplary embodiment. An image processing unit 2002 performs all image processing according to the present exemplary embodiment and includes an image capturing control parameter generation unit 2004 and an image combining processing unit 2006. The image capturing control parameter generation unit 2004 corresponds to the image capturing control parameter generation unit 200 (FIG. 2) according to the first exemplary embodiment, and the image combining processing unit 2006 corresponds to the image combining processing unit 1200 (FIG. 12) according to the second exemplary embodiment. A final image 2003 indicates a final image that is generated according to the present exemplary embodiment. In the present exemplary embodiment, image data from the image capturing unit 2001 is processed by the image processing unit 2002 to obtain the final image 2003.

A case where the image capturing unit 2001 outputs two types of image data will be described below.

Specifically, the two types of image data are image data (hereinafter, "frame image data") 2008 output sequentially in units of frames at short-time exposure and image data (hereinafter, "captured image data") 2009 that is an image capturing result at designated exposure time. The two types of image data can be considered as data to pass through the same path depending on a configuration or a functional operation of the image capturing unit 2001, or can be the same data if the exposure time is adjusted to frame intervals. Hereinafter, for convenience, the two types of image data will be described separately as the frame image data 2008 and the captured image data 2009.

In FIG. 20, the image capturing control parameter generation unit 2004 corresponds to the image capturing control parameter generation unit 200 (FIG. 2) according to the first exemplary embodiment. The image capturing control parameter generation unit 2004 receives the frame image data 2008 as input, determines an image capturing parameter 2010, and outputs the image capturing parameter 2010. The input frame image data 2008 corresponds to the image data 208 in FIG. 2 according to the first exemplary embodiment.

The output image capturing parameter 2010 corresponds to the image capturing parameter 210 in FIG. 2 according to the first exemplary embodiment and includes a shutter speed value, an aperture value, and an ISO sensitivity value. In the present exemplary embodiment, a shutter speed 2011 among the values is extracted, and the extracted shutter speed 2011 is input to the image combining processing unit 2006. The image capturing parameter 2010 is input to a single-image capturing processing unit 2005 in FIG. 20, and the single-image capturing processing unit 2005 designates a shutter speed of the image capturing unit 2001 based on the image capturing parameter 2010, acquires the captured image data 2009, and generates an image as a single-image capturing result.

Similarly, in FIG. 20, the image combining processing unit 2006 corresponds to the image combining processing unit 1200 (FIG. 12) according to the second exemplary embodiment. The image combining processing unit 2006 receives the frame image data 2008 as input, determines an image combining-related parameter, performs image combining processing, and performs plurality-of-image capturing. According to the present exemplary embodiment, the shutter speed 2011 is input to the image combining processing unit 2006.

A combining processing parameter is determined using the shutter speed 2011 as an exposure period for capturing an image corresponding to a long exposure image according to the second exemplary embodiment. Specifically, the image combining processing unit 2006 accumulates the frame image data 2008 for a period corresponding to the shutter speed 2011 in an image accumulation unit corresponding to the image accumulation unit 1201 in FIG. 12 according to the second exemplary embodiment, and an averaging/combining unit corresponding to the averaging/combining unit 1205 according to the second exemplary embodiment combines the accumulated images together to generate an image corresponding to a long exposure image.

In FIG. 20, a selecting unit 2007 selects an image generated by the single-image capturing processing unit 2005 or an image generated by the image combining processing unit 2006 and outputs the selected image as the final image 2003.

A flow in image capturing according to the third exemplary embodiment will be described below with reference to a flowchart in FIG. 21. Mainly a flow that relates to the selecting of an image capturing method according to the third exemplary embodiment will be described below, and redundant descriptions of flows according to the first and second exemplary embodiments that are described in detail above are omitted.

Figure 3:
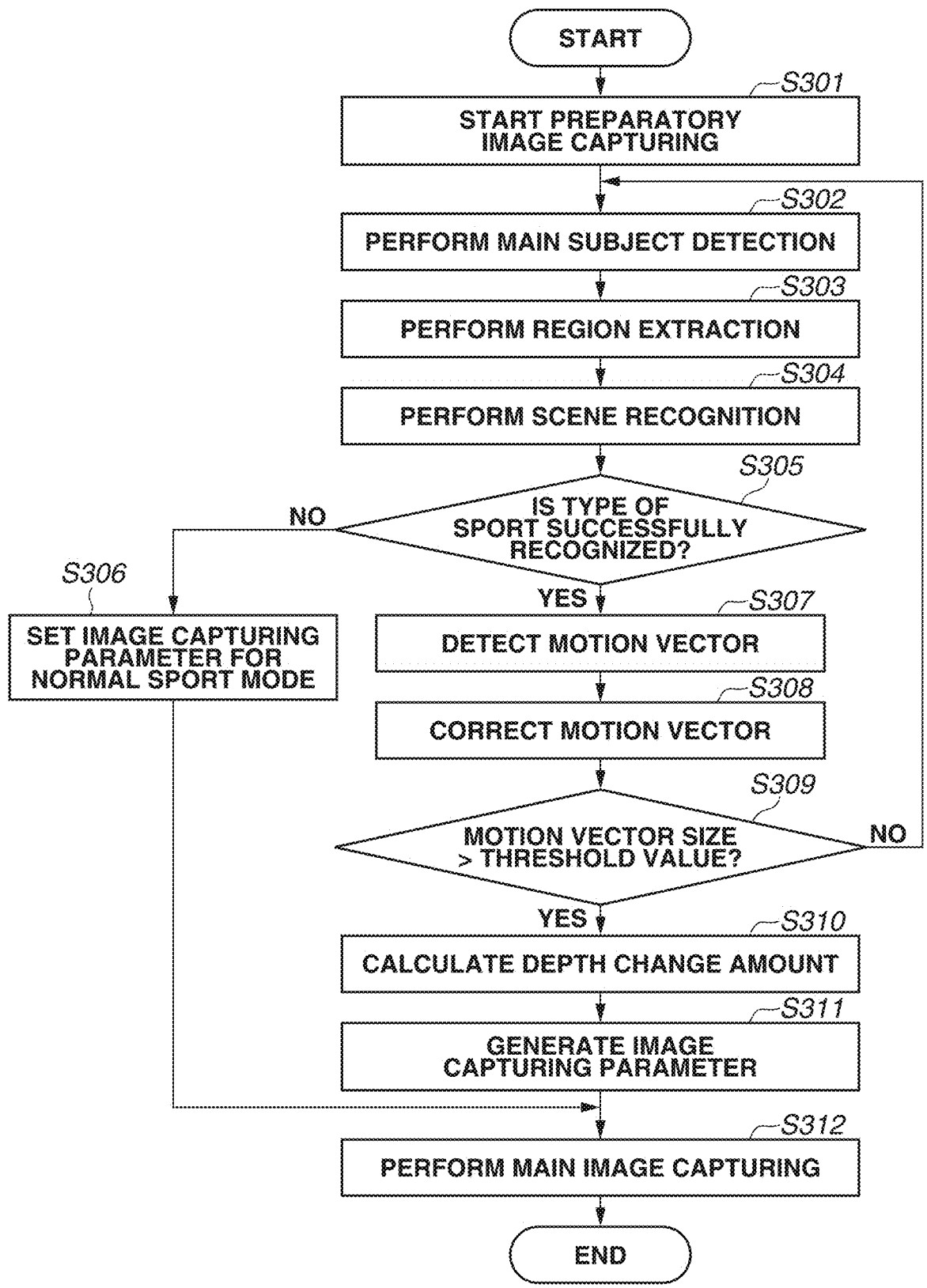
FIG. 3 is a flowchart illustrating operations of the image capturing control parameter generation unit according to the first exemplary embodiment.
Figure 21:
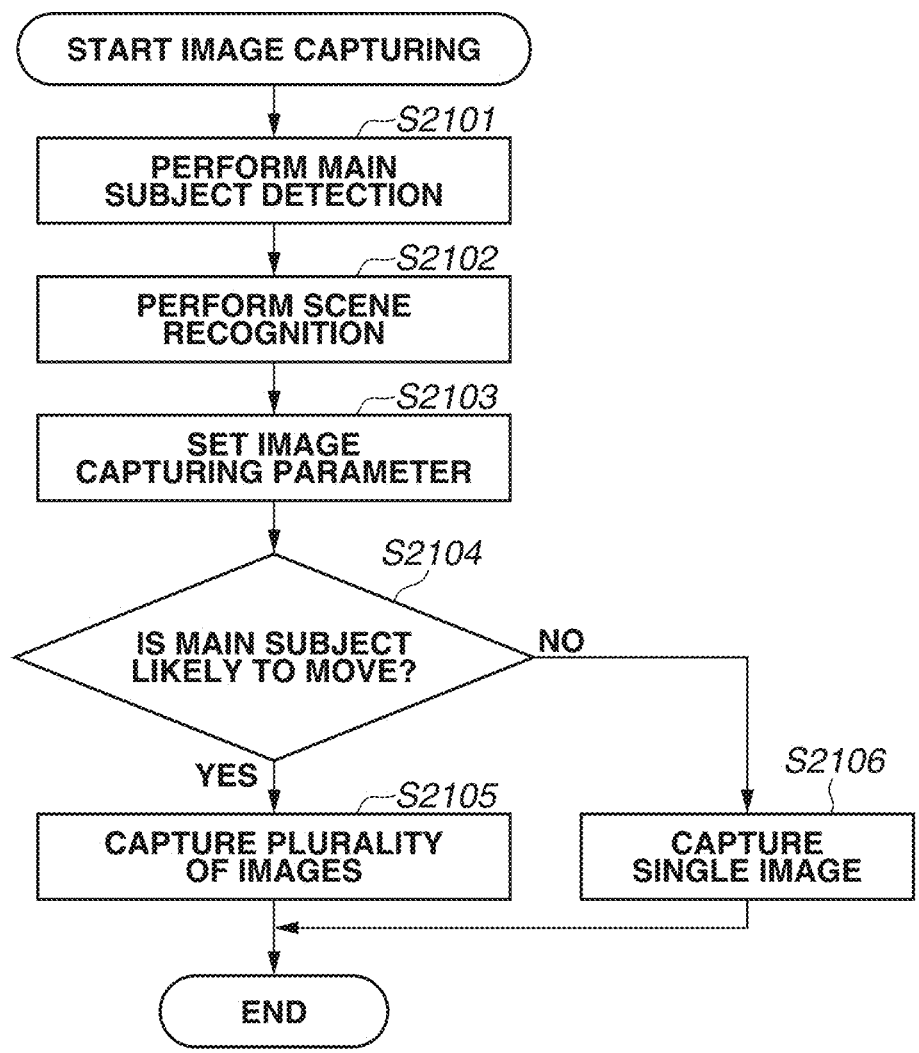
FIG. 21 is a flowchart illustrating operations in image capturing according to the third exemplary embodiment.

In step S2101 in FIG. 21, main subject detection corresponding to the processing performed in step S302 in FIG. 3 according to the first exemplary embodiment is performed. Specifically, the main subject detection is performed on frame image data from the image capturing unit 2001.

Next, in step S2102, scene recognition corresponding to the processing performed in step S304 in FIG. 3 according to the first exemplary embodiment is performed. Specifically, the image capturing scene recognition is performed on the main subject detected in step S2101, and a necessary condition for the next image capturing parameter determination is set.

Next, in step S2103, the image capturing parameter setting corresponding to the processing performed in step S306 or S311 in FIG. 3 according to the first exemplary embodiment is performed. Specifically, the shutter speed, the aperture value, and the ISO sensitivity that are image capturing parameters are determined based on the condition set in the scene recognition. The shutter speed that is determined herein is determined as an exposure period for capturing an image including both a portion with a reduced subject blur and a portion with an allowed or enhanced subject blur as a final image.

Next, in step S2104, main subject motion determination is performed. Specifically, whether a main subject detected in step S2101 is likely to move during the exposure period corresponding to the shutter speed determined in step S2103 is determined, together with the scene recognition result in step S2102. In general, in a case where the determined shutter speed (exposure period) is long, the main subject is more likely to move during the exposure period. Even in a case where the exposure time is short, the main subject may move depending on a type of sport that is an image capturing target or a scene that involves a specific movement. In step S2104, whether the main subject is likely to move during the exposure period is determined, and the image capturing method for use thereafter is selected.

In a case where it is determined that the main subject is likely to move (YES in step S2104), the processing proceeds to step S2105. In step S2105, a plurality of images is captured. On the other hand, in a case where it is determined that the main subject is not likely to move (NO in step S2104), the processing proceeds to step S2106. In step S2106, a single image is captured. In the case where the processing proceeds to step S2105 and the plurality-of-image capturing is performed, the main subject motion determination is performed and images to be combined are selected as described in the second exemplary embodiment.

Now, a relationship between the determined shutter speed (exposure period) and an actual period (actual exposure time) during which the image capturing unit 2001 performs exposure will be described with reference to FIGS. 22A, 22B, and 22C.

Figure 22A:
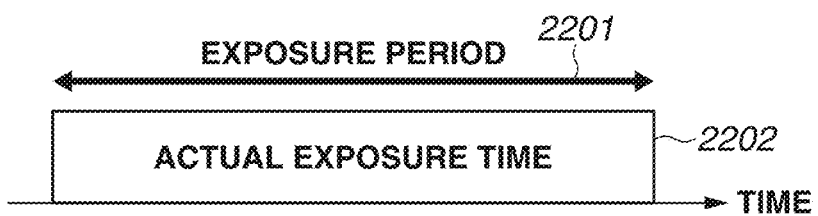
FIGS. 22A, 22B, and 22C are diagrams illustrating an exposure period according to the third exemplary embodiment.

FIG. 22A illustrates a relationship between the exposure period and the actual exposure time in a case where the single-image capturing is performed. An exposure period 2201 indicates the exposure period determined by the image capturing control parameter generation unit 2004 in FIG. 20 and by the image capturing parameter setting in FIG. 21 to capture an image including both a portion with a reduced subject blur and a portion with an allowed or enhanced subject blur as a final image. In FIG. 22A, an actual exposure time 2202 indicates an exposure period during which captured image data is exposed. The captured image data is exposed for the exposure period designated by the image capturing unit 2001 in FIG. 20. In the single-image capturing, the exposure period and the actual exposure time are equal in time length. In FIG. 22A, final image data is obtained simply by performing predetermined processing such as development processing on a single piece of image data after the single-image capturing.

Figure 22B:
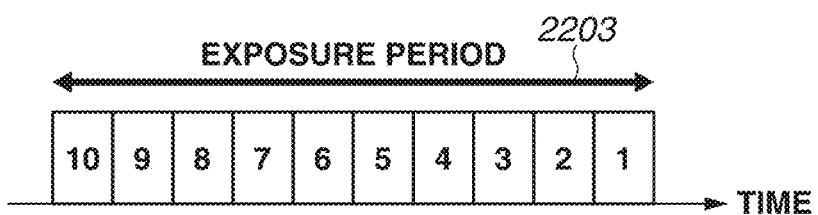
Figure 22C:
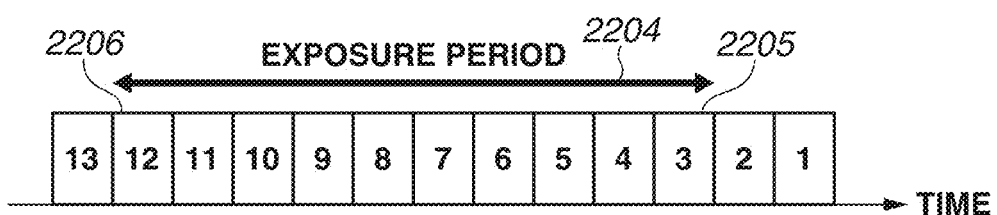

Further, FIG. 22B illustrates a relationship between the exposure time and the actual exposure time in a case where the plurality-of-image capturing is performed. In FIG. 22B, an exposure period 2203 indicates an exposure period, similarly to the exposure period 2201 in FIG. 22A. FIG. 22B illustrates a case where ten images are captured during the exposure period 2203. Specifically, a case where a plurality of pieces of image data 1 to 10 is captured during the exposure period 2203 is illustrated. In the plurality-of-image capturing, an exposure (short-time exposure) shorter than the exposure period is performed to thereby acquire an image without a motion in the main subject as described in the second exemplary embodiment. At the same time, the plurality of captured images is combined together to thereby generate an image including both a portion with a reduced subject blur and a portion with an allowed or enhanced subject blur as a final image as described in the second exemplary embodiment.

While image capturing is repeatedly performed at a short exposure in the plurality-of-image capturing, image combining processing is performed on the number of images starting with any image captured at the short exposure so that the total exposure time corresponds to the exposure period. This is illustrated in FIG. 22C. FIG. 22C illustrates an exposure period 2204 and image data captured at a short exposure time during a period preceding the exposure period 2204, the exposure period 2204, and a period subsequent to the exposure period 2204. In FIG. 22C, image data 1 to 13 are illustrated. For example, image data 2205, which is the third image data, to image data 2206, which is the twelfth image data, in FIG. 22C are to be combined together. In this case, the ten images are combined together to generate an image during an image capturing period, and an image with an image effect equivalent to an image effect in FIG. 22B is acquired. Specifically, in a case where the plurality-of-image capturing is to be performed to capture an image including both a portion with a reduced subject blur and a portion with an allowed or enhanced subject blur in the present exemplary embodiment, only the short-exposure image data acquired during the determined exposure period is necessary in order to acquire a final image with a desired effect, and image data other than those acquired during the exposure period does not have to be combined.

In the plurality-of-image capturing, after all pieces of combining target image data are acquired, the combining processing is performed to acquire final image data. This requires the operation of the combining processing but ensures that an image with a reduced blur of the main subject is acquired.

As described above, in the present exemplary embodiment, the single-image capturing or the plurality-of-image capturing is selected based on the motion state of the main subject, whereby an image including both a portion with a reduced subject blur and a portion with an allowed or enhanced subject blur is generated with an appropriate processing amount.

While exemplary embodiments of the present disclosure are described above, the present disclosure is not limited to the above-described exemplary embodiments, and various modifications and changes are possible within the spirit of the disclosure.

Other Exemplary Embodiments

The present disclosure can also be realized by the process in which a program for implementing one or more functions of the above-described exemplary embodiments is supplied to a system or an apparatus via a network or a storage medium and one or more processors of a computer of the system or the apparatus read the program and execute the read program. Further, the present disclosure can also be realized also by a circuit (e.g., application-specific integrated circuit (ASIC)) that implements one or more functions.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-026115, filed Feb. 22, 2022, which is hereby incorporated by reference herein in its entirety.

What is claimed is:

1. An image processing apparatus comprising:
at least one processor; and
a memory storing instructions that, when executed by the at least one processor, configures the at least one processor to function as:
an acquisition unit configured to acquire an image;
a subject detection unit configured to detect a subject from the image;
a motion amount detection unit configured to detect a motion amount of a first region of the subject and a motion amount of a second region of the subject, the second region being different from the first region; and
an image capturing parameter determination unit configured to determine an image capturing parameter,
wherein the image capturing parameter determination unit refers to the motion amount of the first region and the motion amount of the second region and determines the image capturing parameter so that a blur amount of the first region is less than a first standard and a blur amount of the second region is greater than a second standard, and
wherein execution of the stored instructions further configures the at least one processor to function as a recognition unit configured to recognize a scene where the image is captured, and an estimation unit configured to estimate a moving direction of the second region and a moving range of the second region based on a result of recognition of the scene by the recognition unit and a result of estimation on the second region.

2. The image processing apparatus according to claim 1, wherein execution of the stored instructions further configures the at least one processor to function as an estimation unit configured to estimate at least one of a moving direction of the second region and a position and orientation of the second region, and
wherein the image capturing parameter determination unit sets the image capturing parameter using a result of estimation by the estimation unit.

3. The image processing apparatus according to claim 1, wherein the recognition unit recognizes a type of sport as the scene where the image is captured.

4. The image processing apparatus according to claim 3, wherein the first region is a face/head region of the subject, and the second region is a swing target object in a sport that involves a swing movement.

5. The image processing apparatus according to claim 4, wherein the swing target object in the sport that involves the swing movement is sporting equipment used in the sport.

6. The image processing apparatus according to claim 1, wherein execution of the stored instructions further configures the at least one processor to function as:
a motion vector calculation unit configured to calculate a motion vector between a plurality of frames of the image; and
a distance information calculation unit configured to calculate distance distribution information about the image, and
wherein the motion amount is at least one of a size of the motion vector and an amount of change in the distance distribution information between the plurality of frames of the image.

7. The image processing apparatus according to claim 6, wherein the distance distribution information is one of parallax distribution information acquired from a group of images with a different point of view from each other, contrast distribution information acquired from a group of images with a different focus from each other, and an actual distance distribution measured using a time-of-flight (TOF) method.

8. The image processing apparatus according to claim 7, wherein the distance distribution information includes one of a defocus amount of an image of the subject present in a pixel of the image, a relative image displacement amount between the different points of view, and a distance of the subject in a depth direction.

9. The image processing apparatus according to claim 6, wherein execution of the stored instructions further configures the at least one processor to function as an estimation unit configured to estimate at least one of a moving direction of the second region and a position and orientation of the second region, and
wherein the motion vector calculation unit limits a search range of the motion vector to a moving range of the second region that is estimated by the estimation unit.

10. The image processing apparatus according to claim 6, wherein execution of the stored instructions further configures the at least one processor to function as a motion vector correction unit configured to correct the motion vector, and
wherein the motion vector is corrected based on an angle formed by the motion vector and a result of estimation of a moving direction of the second region or based on a reliability of the motion vector.

11. The image processing apparatus according to claim 10, wherein, in a case where a size of the corrected motion vector is greater than a predetermined threshold value, the image capturing parameter determination unit calculates a shutter speed.

12. The image processing apparatus according to claim 11,
wherein execution of the stored instructions further configures the at least one processor to function as a motion vector accumulation unit configured to accumulate the motion vector over a plurality of frames, and
wherein, in a case where a size of the accumulated motion vector is greater than the predetermined threshold value, the image capturing parameter determination unit calculates a shutter speed.

13. The image processing apparatus according to claim 11,
wherein execution of the stored instructions further configures the at least one processor to function as a recognition unit configured to recognize a scene where the image is captured, and
wherein the threshold value is changed based on a result of recognition by the recognition unit and a relative positional relationship between the main subject and an image capturing apparatus.

14. The image processing apparatus according to claim 1, wherein execution of the stored instructions further configures the at least one processor to function as a display unit configured to cause display of the image on a display device, and a recognition unit configured to recognize a scene where the image is captured, and
wherein the display unit superimposes and causes display of at least one of a result of recognition by the recognition unit and information based on a result of estimation by an estimation unit on the image.

15. The image processing apparatus according to claim 1, wherein the image capturing parameter includes at least one of a shutter speed, an aperture value, and an International Organization for Standardization (ISO) sensitivity.

16. An image capturing apparatus comprising:
an image sensor configured to capture a subject image formed through an optical system and to output the image; and
at least one processor and memory holding a program which makes the processor function as:
an acquisition unit configured to acquire the image from the image sensor;
a subject detection unit configured to detect a subject from the image;
a motion amount detection unit configured to detect a motion amount of a first region of the main subject and a motion amount of a second region of the main subject, the second region being different from the first region; and
an image capturing parameter determination unit configured to determine an image capturing parameter,
wherein the image capturing parameter determination unit uses the motion amount of the first region and the motion amount of the second region and determines the image capturing parameter so that a blur amount of the first region is less than a first standard and a blur amount of the second region is greater than a second standard, and
wherein the at least one processor and memory holding the program which makes the processor further function as a recognition unit configured to recognize a scene where the image is captured, and an estimation unit configured to estimate a moving direction of the second region and a moving range of the second region based on a result of recognition of the scene by the recognition unit and a result of estimation on the second region.

17. A control method for controlling an image processing apparatus, the method comprising:
acquiring an image;
detecting a subject from the image;
detecting a motion amount of a first region of the main subject and a motion amount of a second region of the main subject, the second region being different from the first region; and
determining an image capturing parameter,
wherein the determining refers to the motion amount of the first region and the motion amount of the second region and determines the image capturing parameter so that a blur amount of the first region is less than a first standard and a blur amount of the second region is greater than a second standard, and wherein the method further comprising:
recognizing a scene where the image is captured, and
estimating a moving direction of the second region and a moving range of the second region based on a result of recognition of the scene and a result of estimation on the second region.

18. A non-transitory computer-readable storage medium storing instructions that, when executed by one or more processors, cause the one or more processors to perform a method comprising;
acquiring an image;
detecting a subject from the image;
detecting a motion amount of a first region of the main subject and a motion amount of a second region of the main subject, the second region being different from the first region; and
determining an image capturing parameter,
wherein the determining refers to the motion amount of the first region and the motion amount of the second region and determines the image capturing parameter so that a blur amount of the first region is less than a first standard and a blur amount of the second region is greater than a second standard, and wherein the method further comprising:

recognizing a scene where the image is captured, and estimating a moving direction of the second region and a moving range of the second region based on a result of recognition of the scene and a result of estimation on the second region.

* * * * *